United States Patent [19]

Brachtl et al.

[11] Patent Number: 4,908,861
[45] Date of Patent: Mar. 13, 1990

[54] DATA AUTHENTICATION USING MODIFICATION DETECTION CODES BASED ON A PUBLIC ONE WAY ENCRYPTION FUNCTION

[75] Inventors: Bruno O. Brachtl, Baden-Wuerttenberg, Fed. Rep. of Germany; Don Coppersmith, Ossining, N.Y.; Myrna M. Hyden; Stephen M. Matyas, Jr., both of Manassas, Va.; Carl H. W. Meyer, Kingston, N.Y.; Jonathan Oseas, Hurley, N.Y.; Shaiy Pilpel, Ossining, N.Y.; Michael Schilling, Baden Wuerttemberg, Fed. Rep. of Germany

[73] Assignee: International Business Machines Corporation, Armonk, N.Y.

[21] Appl. No.: 90,633

[22] Filed: Aug. 28, 1987

[51] Int. Cl.$^4$ .................................. H04K 1/00
[52] U.S. Cl. .................................. 380/25; 380/29; 380/30; 380/50; 340/825.34
[58] Field of Search .................. 380/23–25, 380/28–30, 49, 50; 340/825.31, 825.34

[56] References Cited

U.S. PATENT DOCUMENTS

| | | | |
|---|---|---|---|
| 4,193,131 | 3/1980 | Lennon et al. | 380/25 |
| 4,304,961 | 12/1981 | Campbell, Jr. | 380/23 |
| 4,314,097 | 2/1982 | Campbell, Jr. | 380/23 |
| 4,349,695 | 9/1982 | Morgan et al. | 380/25 |
| 4,393,269 | 7/1983 | Konheim et al. | 380/25 |
| 4,649,233 | 3/1987 | Bass et al. | 380/25 X |
| 4,731,842 | 3/1988 | Smith | 380/24 |
| 4,747,050 | 5/1988 | Brachtl et al. | 380/24 X |
| 4,755,940 | 7/1988 | Brachtl et al. | 380/24 X |
| 4,771,461 | 9/1988 | Matyas | 380/24 |

OTHER PUBLICATIONS

D. Coppersmith, "The Real Reason For Rivest's Phenomenon", Advances in Cryptology—CRYPTO '85, Spring-Verlag, Lecture Notes in Computer Science, vol. 218, pp. 535–536.
D. Coppersmith, "Another Birthday Attack", Advances in Cryptology—CRYPTO '85, Springer-Verlag, Lecture Notes in Computer Science, vol. 218, pp. 14–17.
J. M. Pollard, "A Monte Carlo Method for Factorization", BIT, 15, pp. 331–334 (1975).
C. H. Meyer, et al., Cryptography: *A New Dimension in Computer Data Security*, John Wiley & Sons, Inc., NY, N.Y., pp. 517–577 (1982).
R. L. Rivest, et al., "A Method for Obtaining Digital Signatures and Public Key Cryptosystems", *Communications of the ACM*, 21, No. 2, pp. 120–126 (1978).
W. Diffie, et al., "New Directions in Cryptography", *IEEE Trans. on Information Theory*, IT-22, No. 6, pp. 644–654 (1976).

Primary Examiner—Stephen C. Buczinski
Assistant Examiner—Bernarr Earl Gregory
Attorney, Agent, or Firm—John E. Hoel

[57] ABSTRACT

A cryptographic method and apparatus are disclosed which transform a message or arbitrary length into a block of fixed length (128 bits) defined modification detection code (MDC). Although there are a large number of messages which result in the same MDC, because the MDC is a many-to-one function of the input, it is required that it is practically not feasible for an opponent to find them. In analyzing the methods, a distinction is made between two types of attacks, i.e., insiders (who have access to the system) and outsiders (who do not). The first method employs four encryption steps per DEA block and provides the higher degree of security. Coupling between the different DEA operations is provided by using the input keys also as data in two of the four encryption steps. In addition, there is cross coupling by interchanging half of the internal keys. Although this second coupling operation does not add to security in this scheme, it is mandatory in the second method, which employs only two encryption steps per DEA block to trade off security for performance. By providing key cross coupling in both schemes, an identical kernel is established for both methods. This has an implementation advantage since the first method can be achieved by applying the second method twice. The MDC, when loaded into a secure device, authorizes one and only one data set to be authenticated by the MDC, whereas methods based on message authentication codes or digital signatures involving a public key algorithm authorize a plurality of data sets to be authenticated. The MDC therefore provides for greater security control.

21 Claims, 15 Drawing Sheets

DATA AUTHENTICATION USING MODIFICATION DETECTION CODES BASED ON A PUBLIC ONE WAY ENCRYPTION FUNCTION

BACKGROUND OF THE INVENTION

1. Technical Field

The invention disclosed broadly relates to data processing technology and more particularly relates to cryptographic applications in data processing.

2. Background Art

Data tampering is considered to be one of the major threats to data storage and communications. Data tampering means the malicious change of the data in such a way that the legitimate owner is unaware of this sabotage until he suffers its adverse effects. Various techniques have been developed in the prior art to prevent an attacker from gaining access to the data storage medium or communications medium, or alternately to detect when the storage or communications medium has been tampered with. However, due to the increased sophistication of the dedicated attacker, more sophisticated techniques of protecting against data tampering are required.

Some prior art references are as follows:

*Data Encryption Standard, Federal Information Processing Standard (FIPS)*, Publication 46, National Bureau of Standards, U.S. Department of Commerce, Washington, D.C. (January 1977).

C. H. Meyer and S. M. Matyas, *Cryptography: A New Dimension in Computer Data Security*, John Wiley & Sons, Inc., New York, NY, pp. 517–577 (1982).

R. L. Rivest, A. Shamir and L. Adleman, "A Method for Obtaining Digital Signatures and Public Key Cryptosystems," Communications of the ACM, 21, No. 2, pp. 120–126 (1978).

W. Diffie and M. E. Hellman, "New Directions in Cryptography," *IEEE Transactions on Information Theory*, IT-22, No. 6, pp. 644–654 (1976).

Don Coppersmith, "The Real Reason for Rivest's Phenomenon," Advances in Cryptology - CRYPTO '85, Springer-Verlag, Lecture Notes in Computer Science, Vol. 218, pp. 535–536.

Don Coppersmith, "Another Birthday Attack," Advances in Cryptology - CRYPTO '85, Springer-Verlag, Lecture Notes in Computer Science, Vol. 218, pp. 14–17.

J M. Pollard, "A Monte Carlo Method for Factorization," *BIT*, 15, pp. 331–334 (1975).

OBJECTS OF THE INVENTION

It is therefore an object of the invention to provide an improved means to detect the tampering of data stored in the medium.

It is another object of the invention to provide an improved means for detecting the tampering of data transmitted over a communications medium.

SUMMARY OF THE INVENTION

These and other objects, features and advantages are accomplished by the invention, disclosed herein. A cryptographic method and apparatus are disclosed which transform a message of arbitrary length into a block of fixed length (128 bits) defined as the modification detection code (MDC). Although there are a large number of messages which result in the same MDC, because the MDC is a many-to-one function of the input, it is required that it is practically not feasible for an opponent to find them. In analyzing the methods, a distinction is made between two types of attacks, i.e., insiders (who have access to the system) and outsiders (do not). Since an outsider does not have the capability to generate MDCs, he will only succeed if he finds another message having an MDC equal to the MDC of the transmitted legitimate message. An insider, on the other hand, does have the capability to generate MDCs. Consequently, he must not be able to construct two (or more) messages which result in the same MDC. It is shown that the MDC must be at least 128 bits long to defend against birthday type of attacks. This creates a challenge to the designer of the MDC if he wants to employ the Data Encryption Algorithm (DEA) which is a 64 bit algorithm. In effect, a secure method must be found to transform the DEA into a 128 bit algorithm. Two methods are identified which provide a sufficient degree of coupling between DEA processes. The first method employs four encryption steps per DEA block and provides the higher degree of security. Coupling between the different DEA operations is provided by using the input keys also as data in two of the four encryption steps. In addition, there is cross coupling by interchanging half of the internal keys. Although this second coupling operation does not add to security in this scheme, it is mandatory in the second method, which employs only two encryption steps per DEA block to trade off security for performance. By providing key cross coupling in both schemes, an identical kernel is established for both methods. This has an implementation advantage since the first method can be achieved by applying the second method twice.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Authentication is a process which proves that someone or something is valid or genuine. Generally, all authentication schemes have a common step in which the validity of one or more parameters must be checked and there must be a pre-established relationship between the checked parameters and the quantities to be authenticated. Particular implementations are discussed below which allow a large amount of data to be authenticated by a small amount, defined as the modification detection code (MDC) here. The requirement for a cryptographically secure MDC technique is satisfied if it is a strong one way function of the input, where a strong one way function definition is given below, from W. Diffie, et al. entitled "New Directions in Cryptography," *IEEE Transactions on Information Theory*, IT-22, No. 6, pp. 644–654 (1976).

Figure 8:
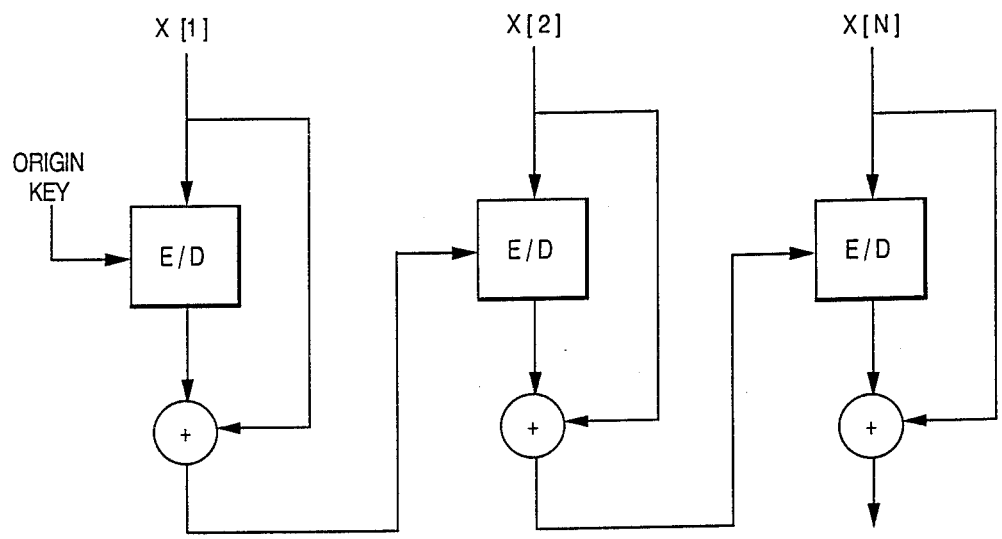
FIG. 8 shows a one way function using a symmetric algorithm.

A function f is a one way function if, for any argument x in the domain of f, it is easy to compute the corresponding value $y=f(x)$; yet for almost all y in the range of f, it is computationally infeasible, given a value of y and knowledge of f, to calculate any x whatsoever with the property that $f(x)=y$. It is important to note that a function is defined which is not invertible from a computational point of view, but whose noninvertibility is entirely different from that normally encountered in mathematics. A function f is normally called "noninvertible" when the inverse of a point y is not unique; i.e., there exist distinct points x1 and x2 such that $f(x1)=y=f(x2)$. This is not the sort of inversion difficulty that is required here. Rather, it must be overwhelmingly difficult, given a value y and knowledge of f, to calculate any x whatsoever with the property that $f(x)=y$. The block diagram of FIG. 8 shows a one way function concept using a symmetric algorithm. (X[1]through X[n]represent the input blocks and + indicates module 2 addition.)

To distinguish between public and secret outputs from the one way function process, it is suggested that an encipher operation be used for generating public quantities and a decipher operation be used if the result must be kept a secret. To eliminate birthday types of attacks, the one way function requires 128 bits for adequate strength, as discussed below.

Application 1: Message Integrity Check with Modification Detection Code

To check for the integrity of received data, a digital signature, DSG, can be defined which has the property that a recipient can prove to himself and a third party that the received data came from the legitimate sender. A DSG can be generated with a symmetric algorithm such as the data encryption algorithm (DEA) in *Data Encryption Standard, Federal Information Processing Standard (FIPS) Publication* 46, National Bureau of Standards, U.S. Department of Commerce, Washington, D.C. (January 1977) and C. H. Meyer, et al. entitled "Cryptography: A New Dimension in Computer Data Security," John Wiley & Sons, Inc., New York, NY, pp. 517–577 (1982). ut an implementation with an asymmetric algorithm (public key algorithm, PKA) is much less complex in W. Diffie, et al. entitled "New Directions in Cryptography," *IEEE Transactions on Information Theory*, IT-22, No. 6, pp. 644–654 (1976) and R. L. Rivest, et al. entitled "A Method for Obtaining Digital Signatures and Public Key Cryptosystems," *Communications of the ACM*, 21, No. 2, pp. 120–126 (1978), and thus is assumed to be used here. Since the DSG is generated with a secret key, SK, but checked with the corresponding public key, PK, a reversible approach must be implemented to recover relevant information from the DSG for checking purposes. This requires that the length of the DSG must be a multiple of the block size of the PKA. Thus the minimum length of the DSG is equal in length to the block size of the PKA.

Figure 1:
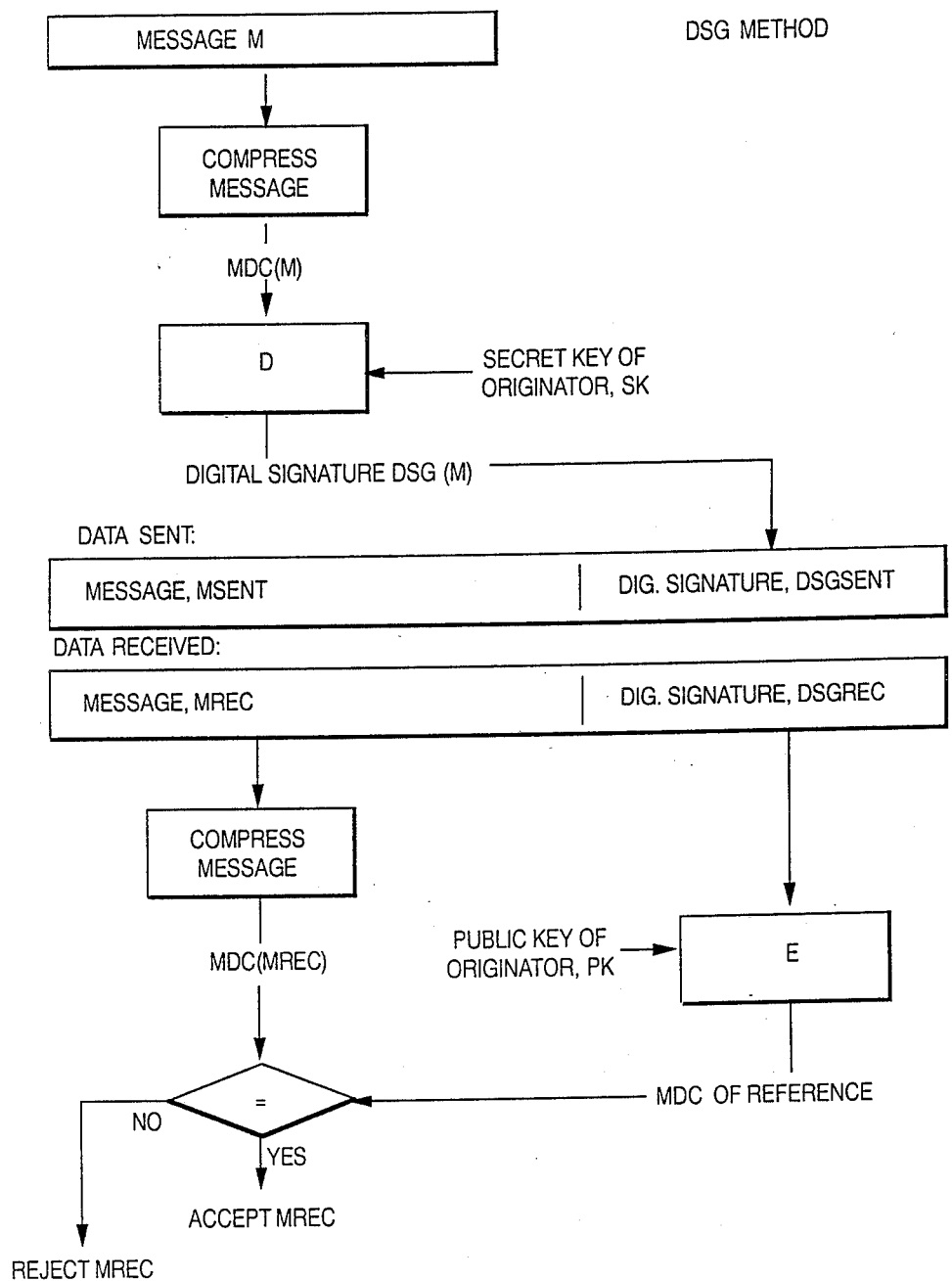
FIG. 1 is a schematic diagram of message authentication involving MDC.
Figure 2:
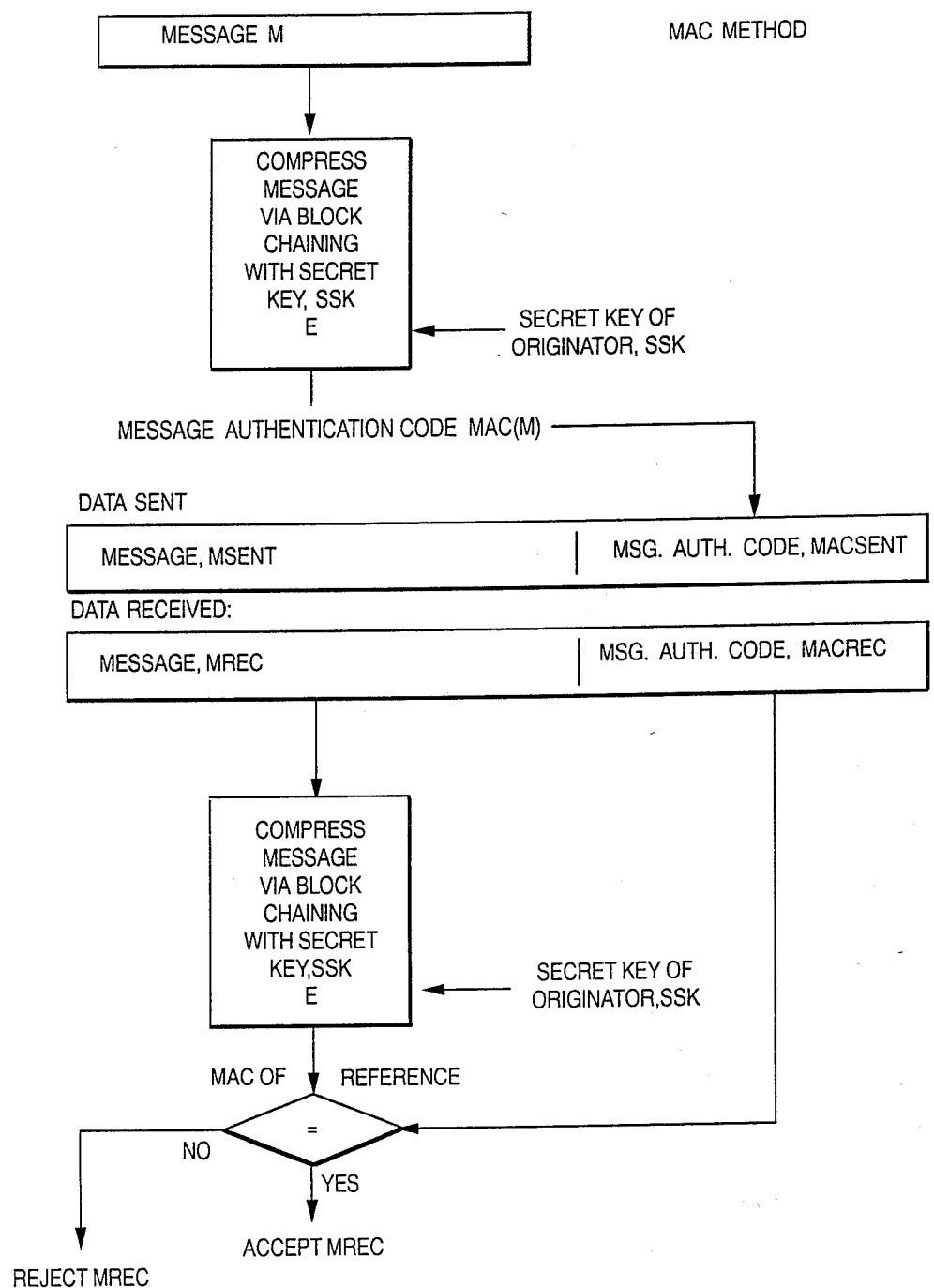
FIG. 2 shows the standardized message authentication concept.

The generation of a digital signature of minimum length with a public key algorithm is achieved by first compressing (hashing) a message, M, of arbitrary length, to a fixed length MDC quantity. Instead of calculating the digital signature for the message, the DSG is calculated for the compressed message. The MDC must be generated with public quantities in order for the sender and receiver to be able to use the same method of compression without the need to introduce secret parameters. (A secret quantity would defeat the PKA concept which allows authentication of received information with public cryptographic variables.) Data can now be verified by transmitting the message and its signature, expressed as M and DSG(SK,MDC(M)), respectively, where SK is the required secret key which generates the digital signature. The concept of the authentication scheme is shown in FIG. 1. For reasons of completeness, the concept of the standardized message authentication method, using the DEA, is shown in FIG. 2. Here, a message authentication code (MAC) as in American National Standard for Financial Institution Message Authentication X9.9 (1982), instead of a DSG, is transmitted, together with the message M, expressed as M and MAC(SSK,M), respectively, where SSK is the required secret DEA key which generates the MAC. The MAC is generated, as well as checked, with the same secret key, SSK. Due to this fact, the MAC generation process does not have to be reversible. Taking advantage of this, the standardized procedure, using the DEA, calls for a MAC of 32 bits, regardless of the information length. However, sender and receiver have the same key information and thus are not separated cryptographically on the algorithm level as is the case for a PKA. Nevertheless, a high degree of separation can still be obtained with implementation methods as in C. H. Meyer, et al. entitled "Cryptography: A New Dimension in Computer Data Security," John Wiley & Sons, Inc., New York, NY, pp. 517–577 (1982).

Application 2: Program Load with Modification Detection Code

To assure proper operation of a system node (such as a terminal), the integrity of the underlying process must be assured. Otherwise attacks are possible where an opponent is able to circumvent security measures by loading a program which contains sections, inserted by an opponent, to retrieve information from the system he is not supposed to get.

To check for program integrity, three methods could be used, (1) the MAC method using the DEA, (2) the DSG method using a PKA, or (3) the MDC method, discussed below, using the DEA. The first one employs identical secret keys for generating as well as checking of a MAC associated with the program loading procedure. The second method generates a digital signature for the program with a secret key and validates the signature with the corresponding public key, which is prestored with integrity. The third method is based only on public parameters.

The advantage of the DSG method is that any number of programs can be loaded and checked with the same quantity, PK, since a valid DSG can be generated by that node in the system (origin node) which possesses the correct secret key, SK. (The corresponding public key, PK, must be installed in the node where the program is to be loaded.) The disadvantage is that managing this secret key and limiting its use represents a major security problem. The MAC method has the additional disadvantage that the same secret key must also be managed at the destination node.

An alternate method, which does not employ any secret key, only requires that a modification detection code on the program is generated and distributed. Only the integrity but not secrecy of the loaded MDC, which is independent of the system node at which the program is to be loaded, must be assured. However, the MDC must have the property that it must not be economically feasible to construct another program resulting in a given, predetermined, MDC. This requires that the MDC is a strong one way function of the input. Consequently, an MDC is only associated with one program.

Loading of a bogus program is now only possible if the stored reference MDC can be changed by an opponent to his bogus MDC associated with his bogus program. A similar attack is possible with a PKA implementation using DSG techniques, since an opponent who has the capability to change system references, such as an MDC, can also change a public key. After generating his own PKA key pair, PK/SK, he could install the bogus PK, and generate a bogus DSG with the bogus SK for a bogus program. These attacks are not viable if the public quantities, i.e., MDC or PKA, are loaded and stored with integrity, as required.

The advantage of the MDC program load approach is that the manufacturer of the cryptographic device, who may wish also to provide the software program to be loaded, is able to calculate and release to customers the MDC which is to be used to load that software program. Thus, the customer can use the supplied MDC to load the software program with integrity. The fact that the manufacturer can calculate the MDC using only public data means that the manufacturer has no liability which would be associated with knowing a secret key. The customer, on the other hand, is also protected since the manufacturer is not able to misuse the data he has to cause a bogus program to be loaded into the customer's device. Only that one program which produces the correct MDC can be loaded and that MDC can be validated by anyone.

This contrasts sharply with the MAC and PKA approaches. (If the manufacturer knew the secret component needed to calculate the MAC or DSG, he could cause any program of his choosing to be loaded.) The point is that the MDC achieves two goals that are not achieved with the DSG or MAC methods, i.e., (1) the method allows a third party to be involved in the MDC generating process without having to assume any liability, and (2) the method events the third party from delivering a bogus program which has the same MDC as the legitimate program.

Figure 3:
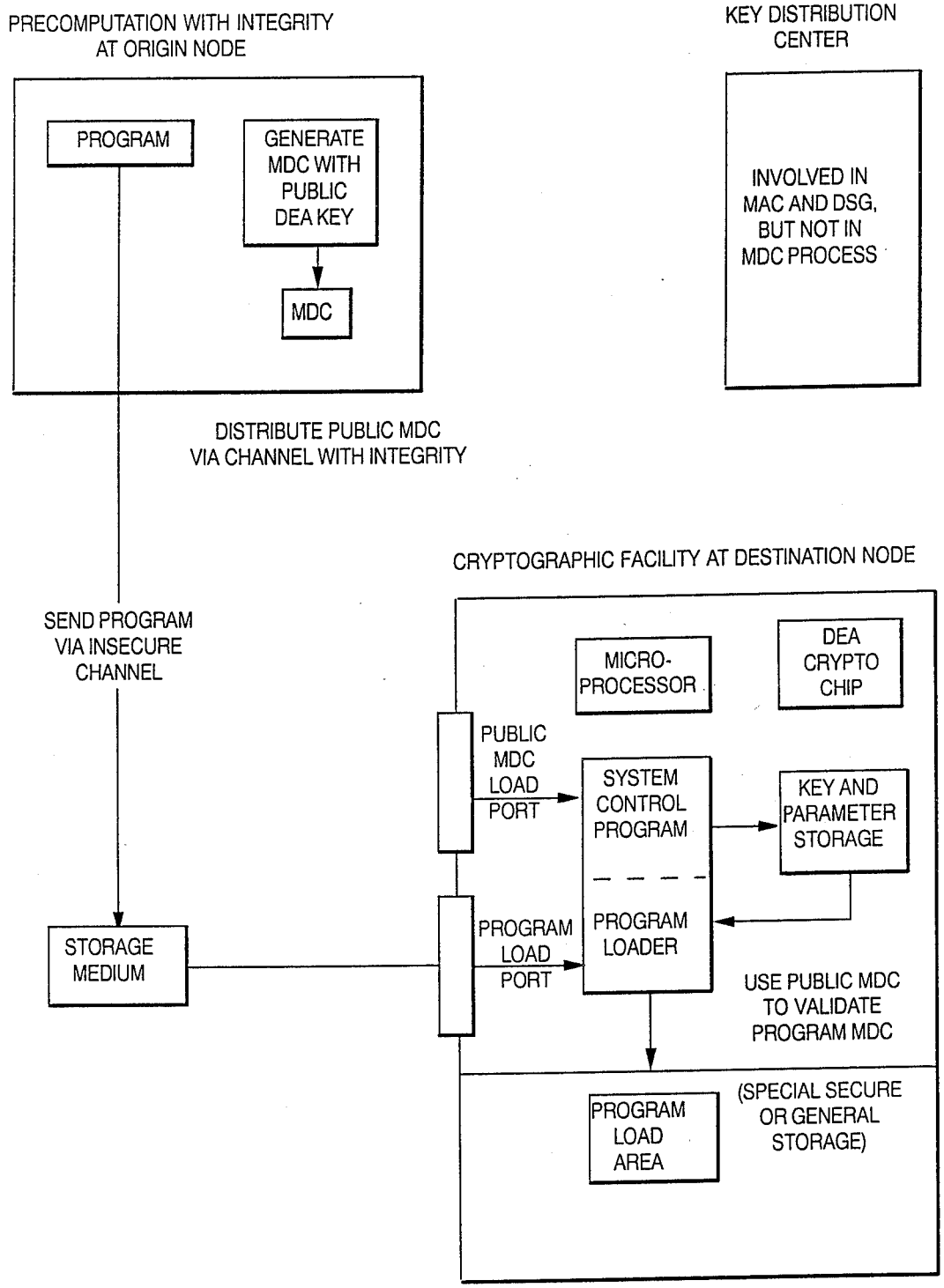
FIG. 3 shows program loading with integrity using the MDC method.
Figure 4:
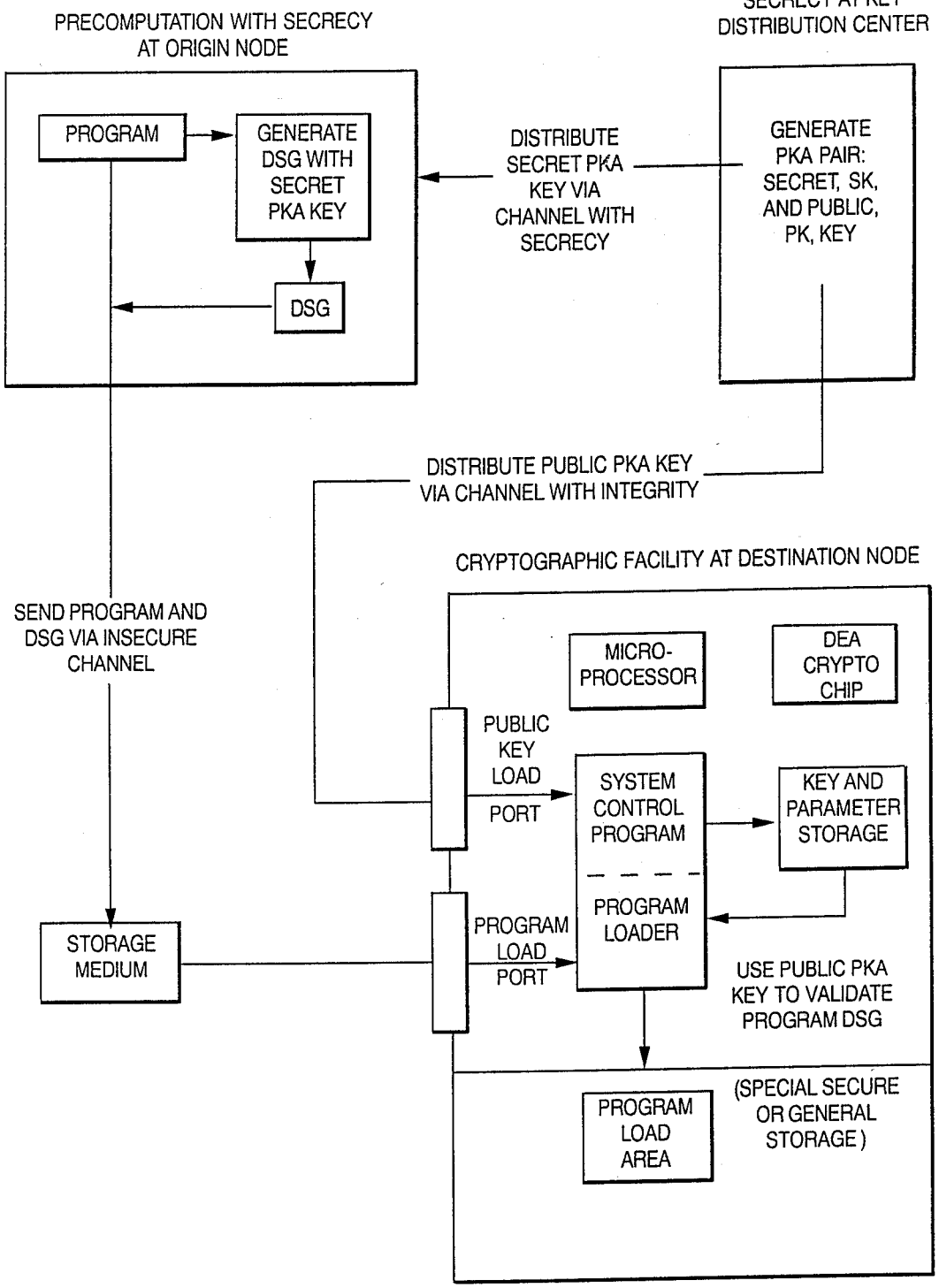
FIG. 4 shows program loading with integrity using the DSG method.
Figure 5:
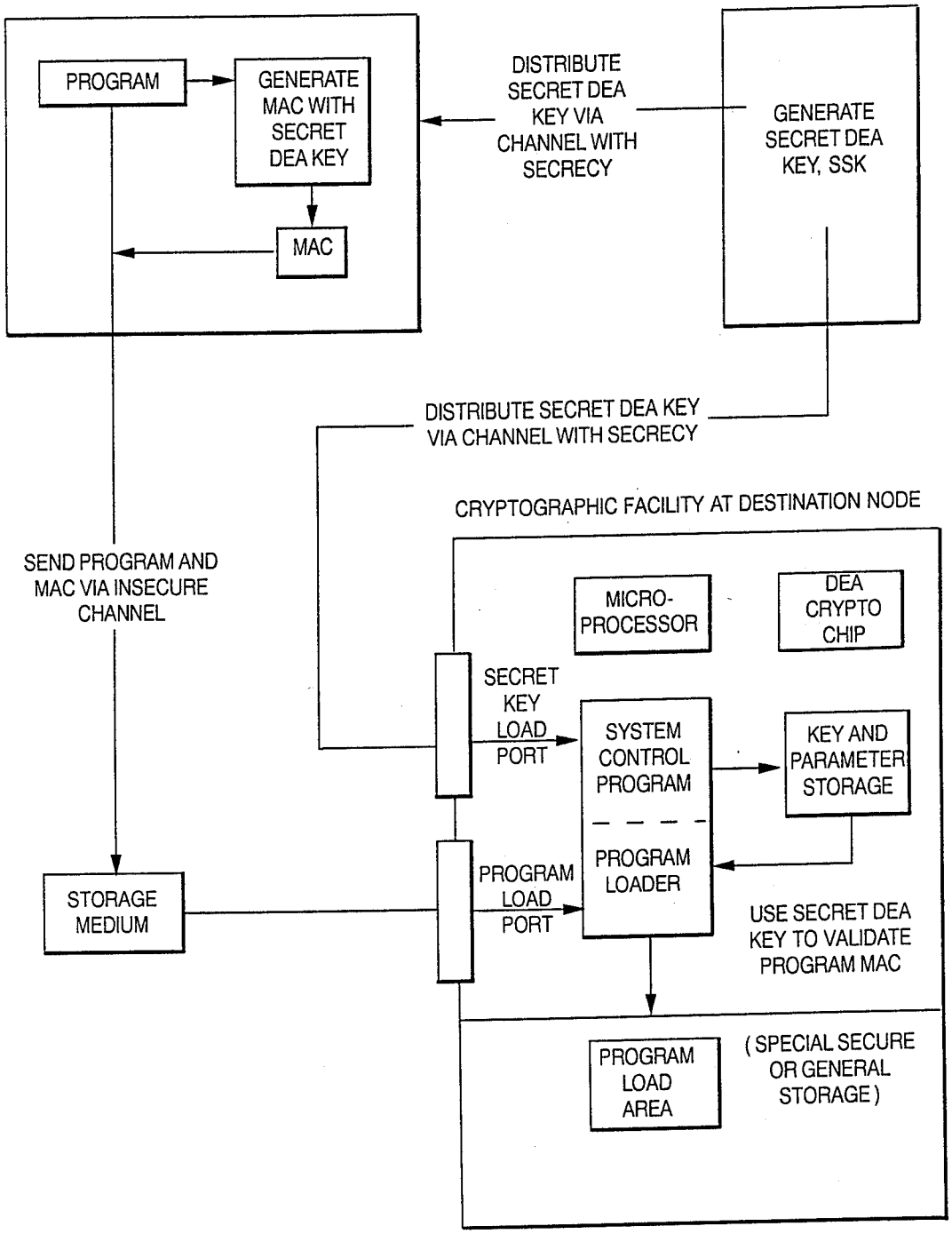
FIG. 5 shows program loading with integrity using the MAC method.

FIG. 3 shows a diagram demonstrating the method of MDC program loading. A similar diagram is used to demonstrate the MAC and DSG concept and to highlight the difference between these methods (FIGS. 3 and 4). The generation and distribution of PKA and DEA keys for these latter methods are indicated in the figures by the key distribution center. Table 1 lists important requirements to assure program loading with integrity.

TABLE 1
Summary of Requirements for Program Integrity

| METHOD | ORIGIN NODE | INITIALIZATION CHANNEL | DESTINATION NODE |
|---|---|---|---|
| | | REQUIREMENTS | |
| MAC | Assure secrecy of DEA key | Distribute secret DEA key via channel with secrecy | Assure secrecy of DEA key |
| | Attacks | | |
| | Compromise of secret key allows true MAC generation and thus loading of an arbitrary program. Loading of fake secret DEA key allows bogus MAC generation and thus loading of an arbitrary program. | | |
| DSG | Assure secrecy of secret PKA key | Distribute public PKA key via channel with integrity | Assure integrity of PKA key |
| | Attacks | | |
| | Compromise of secret key allows true digital signature generation and thus loading of an arbitrary program. Integrity violation of public key allows bogus digital signature generation and thus loading of an arbitrary program. | | |
| MDC | Assure integrity of MDC reference | Distribute public MDC ref. via channel with integrity | Assure integrity of MDC reference |
| | Attacks | | |
| | Integrity violation of MDC reference allows bogus MDC generation and thus loading of an arbitrary program. | | |

Legend:
MAC = Message Authentication Code using the DEA
DSG = Digital Signature using a PKA
MDC = Modification Detection Code using the DEA
Note: There is a general requirement that the program must be validated via administrative procedures to make sure that it is written as specified.

Summarizing the MDC method approach: After the appropriate MDC is loaded by trusted security personnel into the system node such that the integrity of this public quantity is assured, a program integrity check is performed at the node by calculating the appropriate MDC on a program to be loaded and comparing it with the stored reference. The reference, a global universal parameter, is in this case only program dependent.

Cryptographic Requirements for Modification Detection Code

In analyzing the cryptographic strength of modification detection codes, a distinction is made between two types of attacks, i.e., insiders (who have access to the system) and outsiders (who do not). The insider is one who can have one message authenticated on his behalf, and later will substitute a second message with the same MDC. Depending on the implementation, such an attack may require the sophistication of a systems programmer or may even be launched by an ordinary systems user.

Consequently, an insider must not be able to construct two (or more) messages which result in the same MDC. If he is able to do that, he could send one message together with the signature, and later claim that he sent the other one. (The signature will be the same for all messages having the same MDC.) An outsider does not have the capability to generate signatures. Hence he will only succeed if he finds another message having an MDC equal to the one of the transmitted legitimate message. To summarize: The insider starts with two partial texts T and T', and must create messages M and M', with M containing T and little else, satisfying CE(M)=CE(M'). The outsider starts with a partial text T and a given MDC, and must create a message M, with M containing T and little else, satisfying CE(M)=given value. Requirements to block insider attacks are thus more stringent than the ones for outsider attacks.

To thwart insider attacks, the one way function output must have a minimum block size of 128 bits. Such a condition arises from the fact that there are exhaustive attacks possible which reduce the work factor by an order of magnitude of the square root. Such attacks are based on the so-called "Birthday Paradox." This phrase is coined due to the surprising result that in a group of 23 people there is a 50% chance that at least two people have the same birthday. (23 is much less than the 365 possible days for which a match can occur.)

The probability, q, of having no match in birthdays is given by the expression q=365*364*363* . . . (365−(r−1))/365**r; where * indicates multiplication and ** exponentiation. The probability, p=1−q of at least one match (common birthday) is shown as a function of r, the number of people in a group, in Table 2.

Numerous cryptographic attacks can now be devised which take advantage of this phenomenon. In one attack scenario n1 quantities of interest are precalculated and stored. At a latter point in time, n2 quantities are intercepted and tested for equality with the previously stored quantities. If N represents the total number of combinations of the quantities, then n1/N is the probability that an intercepted value falls into the set of precalculated values, thus finding a match. The probability, q, of not finding a match with n2 intercepted values can be expressed as q=(1−n1/N)**n2, provided that the trials are independent. Taking the natural logarithm of q results in ln q=n2(1-n1/N). For n1/N ° ° 1 the result simplifies to in g=−n1*n2/N. Consequently q=e**[-(n1*n2/N)]. For n1=n2=n and n=square root of N, q is equal to (1/e)=0.3679 and the probability, p, of finding at least one match is equal to p=1−q=0.6321. Thus the work factor for finding a match is much less than N, i.e., order magnitude N**0.5.

(Using a similar approximation for the birthday problem indicated in Table 2, the probability of at least one match is equal to p=1−e**[−(1.5*r**2)/N]. The result differs from the above one by a factor of 1.5 because the trials here are not independent.)

To find a match requires only N0.5 precalculations and thus the same amount of storage and N0.5 intercepted data calculations which reduces the work factor, expressed in terms of storage and calculation requirements, significantly. Using 128 bits for the output of a one way function a work factor of order magnitude 2**64 can be achieved, which is sufficiently high.

The direct use of the DEA in the method of FIG. 1 is therefore not acceptable since the DEA would produce only 64 bits. To employ the DEA, the basically sound scheme of FIG. 1 must be modified to generate an acceptably strong one way function output of 128 bits.

TABLE 2

| Birthday Paradox Problem | | |
| --- | --- | --- |
| Number of People r | Prob(no match) q = 1 − p | Prob(match) p |
| 4 | 0.984 | 0.016 |
| 8 | 0.926 | 0.074 |

TABLE 2-continued

| Birthday Paradox Problem | | |
| --- | --- | --- |
| Number of People r | Prob(no match) q = 1 − p | Prob(match) p |
| 12 | 0.833 | 0.167 |
| 16 | 0.716 | 0.284 |
| 20 | 0.589 | 0.411 |
| 23 | 0.493 | 0.507 |
| 24 | 0.462 | 0.538 |
| 28 | 0.346 | 0.654 |
| 40 | 0.109 | 0.891 |
| 56 | 0.012 | 0.988 |

Modification Detection Code (MDC) Generation with the DEA

Two different MDC generation schemes are discussed (FIGS. 6 and 7) which allow to authenticate a message X[1[],X[2],X[3], . . . ,X[n] where each block X[i] is 64 bits long. Certain 64-bit quantities are used both as inputs to the DEA (which are naturally 64 bits), and as keys (which are 56 bits). In the latter case, the eight parity bits are ignored. The starting point of the MDC generation process is determined by two 64-bit quantities, K1[1] and K2[1]. These can be standardized, or randomly generated by the authenticator. (Both of these possibilities are explored later.) If static origin keys are used, they are defined here:

K1[1]=hex'5252525252525252'

K2[1]=hex'2525252525252525'

Work factors associated with the two proposed MDC schemes are summarized in Table 3. To evaluate them, the following references were used: Don Coppersmith, "The Real Reason for Rivest's Phenomenon," Advances in Cryptology - CRYPTO '85, Springer-Verlag, Lecture Notes in Computer Science, Vol. 218, pp. 535–536; Don Coppersmith entitled "Another Birthday Attack," Advances in Cryptology - CRYPTO '85, Springer-Verlag, Lecture Notes in Computer Science, Vol. 218, pp. 14–17; J. M. Pollard, "A Monte Carlo Method for Factorization", BIT 15 (1975), pp. 331–334; and J. M. Pollard, "Theorems on Factorization and Primality Testing," Proc. Cambridge Philos. Soc. 76 (1974), pp. 521–528.

TABLE 3

| | Work Factor for MDC Schemes | | | |
| --- | --- | --- | --- | --- |
| ENCRYP-TIONS per DEA BLOCK | INSIDER ATTACK | | OUTSIDER ATTACK | |
| | Time | Storage | Time | Storage |
| Four with Key Cross Coupling | 261 | negligible | 293 | 2**54 (128 bits) |
| Two with Key Cross Coupling | 254 | negligible | 255 255+k) | 255 2**55−k) (64 bits) |

One major building block in these schemes is the mapping f(K,X)=X xor eK(X), where eK(X) is the encryption of X with the key K and "A xor B" denotes the bitwise "exclusive or" of the quantities A and B. Concatenation, to be employed later, is indicated by the symbol //.

Apparently, given a value F it is very difficult to find values K,X such that f(K,X)=F. The only known way is trial and error, which requires about 264 trials. Even if one pair of values (K,X) is given such that $f(K,X) = F$, the task of finding a second pair $(K',X')$ such that $f(K',X') = f(K,X) = F$, apparently requires $2^{}64$ trials, except:

(1) if Kc denotes the complement of K, one obtains $f(Kc,Xc) = f(K,X)$ due to the complementary property of the DEA (see *Data Encryption Standard, Federal Information Processing Standard (FIPS) Publication* 46, National Bureau of Standards, U.S. Department of Commerce, Washington, D. C. (January 1977);

(2) if K is one of the four "weak keys" (see *Data Encryption Standard, Federal Information Processing Standard (FIPS) Publication* 46, National Bureau of Standards, U.S. Department of Commerce, Washington, D.C. (January 1977), then $f(K,X) = f(K,eK(X))$. (Note that $e[eK(X)] = X$ if K is a weak key);

(3) if K is one of the four "weak keys" there are $2^{**}32$ values of X (easily found) such that $f(K,X) = 0 \ldots 0$ (64 bits of 0's);

(4) if K is one of four "semi-weak keys" alternating in each half-key, there are $2^{**}32$ values of X (easily found) such that $f(X,X) = 1 \ldots 1$ (64 bits of 1's).

The properties (3) and (4) follow from Don Coppersmith "The Real Reason for Rivest's Phenomenon," Advances in Cryptology - CRYPTO '85, Springer-Verlag, Lecture Notes in Computer Science, Vol. 218, pp. 535-536. With these exceptions, it is apparently also difficult ($2^{**}64$) to find a value of X, given K and F, such that $f(K,X) = F$, or to find a value of K, given X and F, such that $f(K,X) = F$.

Several attacks were tried, specific to the schemes in question, but no method to take advantage of the peculiarities of the present scheme were found. For example, in time $2^{}27 = 2^{}(54/2)$ one can arrange that the two components AL and BR of the new key $K1'[i+1]$ agree between the two messages, so that $K1[i+1] = K1'[i+1]$. But one still has $K2[i+1]$ unequal to $K2'[i+1]$, and there seems to be no economical way to extend the equality.

The special properties of "weak keys" (2,3,4) make it desirable to avoid these weak keys in the "key" positions. If the origin keys are not predetermined, one could check for the existence of undesirable keys at each step; if one occurs during the MDC generation process, the process is restarted with different starting values K1[1] and K2[1]; if one occurs during the MDC verification process, the validation process declares that the MDC is invalid.

The method proposed here is valid, for variable as well as for fixed origin keys. Undesirable keys are eliminated in the one way function by modifying the external key, indicated by mod (for modification), and by redefining f as follows:

$f(Kj,X) = X$ xor $eKjmod(X)$ ; $j = 1,2$

The key Kjmod, for j equal to 1 or 2, i derived from Kj by fixing Kj in two bit positions to avoid weak as well as semi-weak keys. This reduces key space to 54 bits. To define the key modification, let the external key bits be numbered 1 to 64, starting from the most significant bit position. K1mod is then generated from K1 by setting bits 2 and 3 to "10," whereas K2mod is obtained from K2 by adjusting bits 2 and 3 to "01." If only weak keys must be eliminated, bits 2 and 3 are complemented, in which case key space is reduced to 55 bits.

The first MDC generation technique involves two encryptions per 64 bit DEA block with an outsider attack work factor of time $2^{}55$ (encryption steps) and storage $2^{}55$ (64 bit quantities), and an insider attack work factor of time $2^{}54$ (encryption steps) and negligible storage. The second one uses four encryptions per DEA block and has an outsider attack work factor of time $2^{}93$ (encryption steps) and storage $2^{}54$ (128 bit quantities). The insider attack work factor is $2^{}61$ encryptions for computation time and negligible storage. (This work factor only applies if weak and semi-weak keys are not employed in the MDC calculations.) Although it is recommended to use the stronger scheme, the implementer has the option to trade off security for performance. Also, the two MDC techniques are designed such that the four encryptions per block method can be implemented by using the two encryptions per block method twice.

Figure 6:
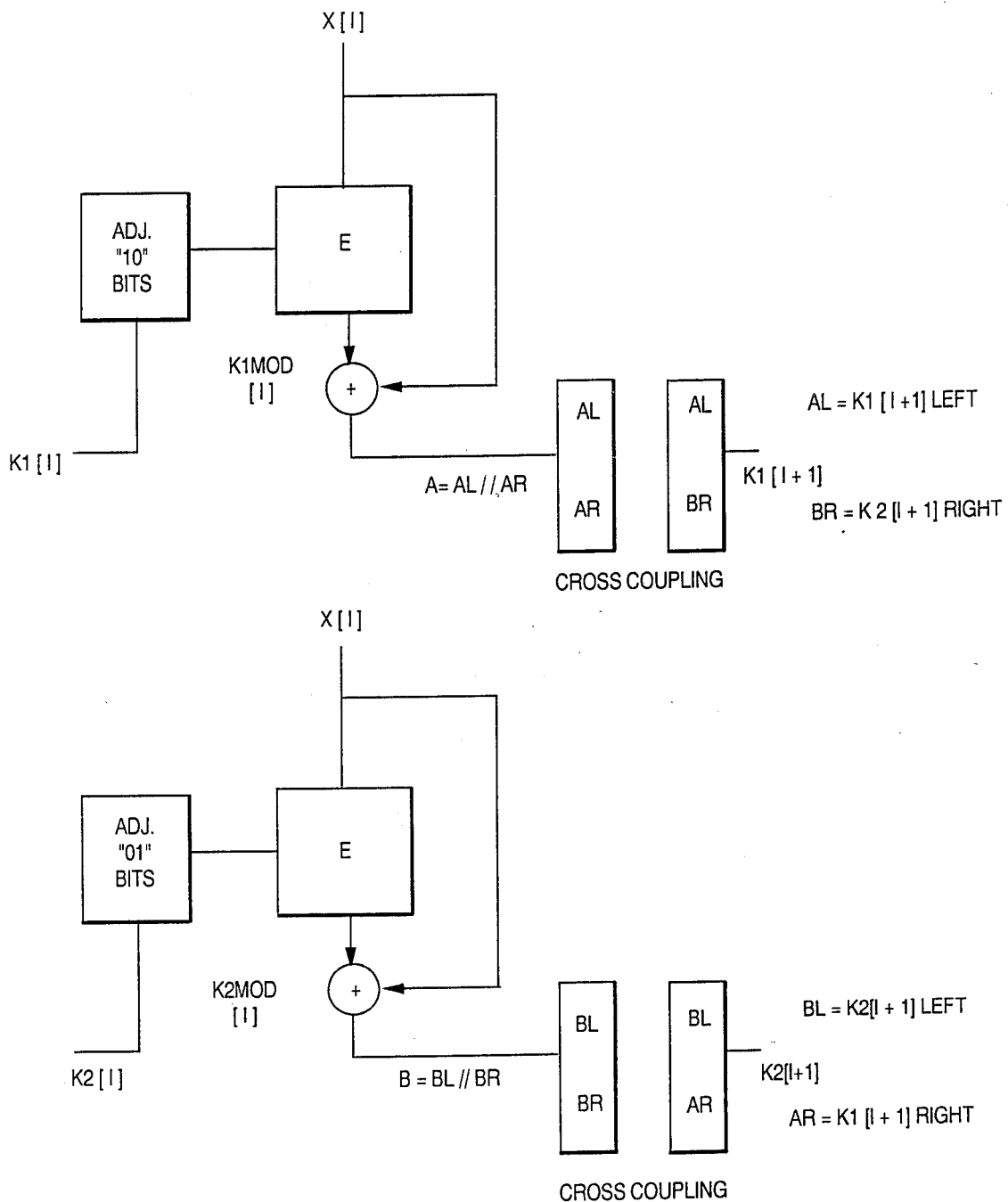
FIG. 6 shows a one way function requiring two encryptions per DEA block.

Equations for One-Way Function with Two Encryptions Per Block (FIG. 6)

$A = f(K1[i],X[i]) = AL//AR$
(AL = left half part of A, AR = right half part of A)
$B = f(K2[i],X[i]) = BL//BR$
(BL = left half part of B, BR = right half part of B)
New Keys:
$K1[i+1] = AL//BR$
(Left half of A concatenated with right half of B)
$K2[i+1] = BL//AR$
(Left half of B concatenated with right half of A)
Modification Detection Code (MDC of 128 bits)
$MDC = K1[n+1]//K2[n+1] = MDC1//MDC2$
(n is equal to the number of 64 bit message blocks as defined above.) The final values, K1[n+1] and K2[n+1], together with the initial values K1[1] and K2[1], if they were chosen at random, form the compressed version of the message.

Figure 7:
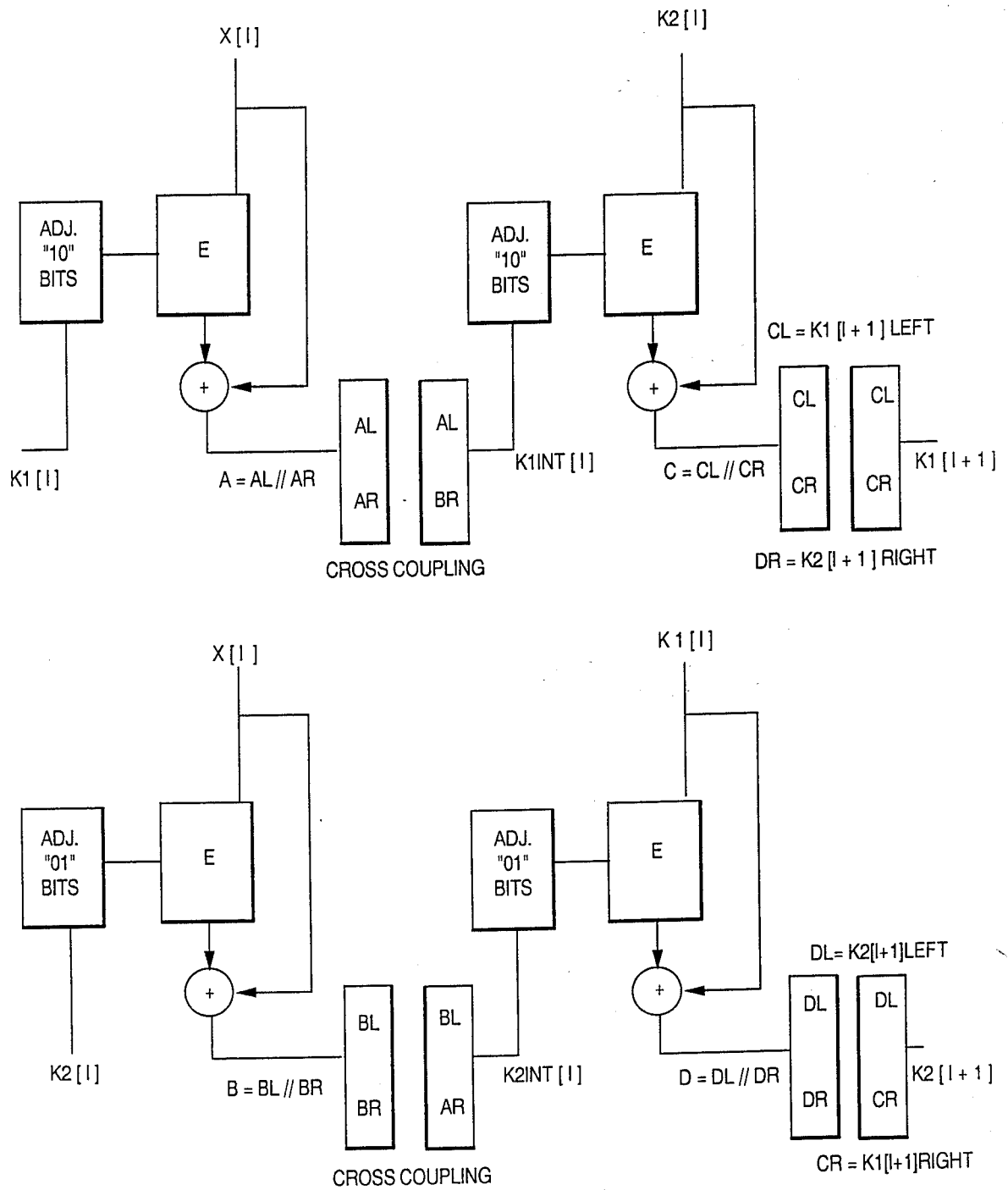
FIG. 7 shows a one way function requiring four encryptions per DEA block.

Equations for One-Way Function with Four Encryptions Per Block (FIG. 7)

$A = f(K1[i],X[i]) = AL//AR$
$B = f(K2[i],X[i]) = BL//BR$
Intermediate Keys:
$K1int[i] = AL//BR$ (Left half of A concatenated with right half of B)
$K2int[i] = BL//AR$ (Left half of B concatenated with right half of A)
New Keys:
$C = f(K1int[i],K2[i]) = CL//CR$
$D = f(K2int[i],K1[i]) = DL//DR$
$K1[i+1] = CL//DR$ (Left half of C concatenated with right half of D)
$K2[i+1] = DL//CR$ (left half of D concatenated with right half of C)
Modification Detection Code (MDC of 128 bits)
$MDC = K1[n+1]//K2[n+1] = MDC1//MDC2$

SUMMARY

Two cryptographic methods which transform a message of arbitrary length into a block of fixed length (128 bits) defined modification detection code (MDC), are discussed. Although there are a large number of messages which result in the same MDC, because the MDC is a many-to-one function of the input, it is required that it is practically not feasible for an opponent to find them. In analyzing the methods, a distinction is made between two types of attacks, i.e., insiders (who have access to the system) and outsiders (who do not).

Since an outsider does not have the capability to generate MDCs, he will only succeed if he finds another message having an MDC equal to the MDC of the transmitted legitimate message. An insider, on the other hand, does have the capability to generate MDCs. Consequently, he must not be able to construct two (or more) messages which result in the same MDC.

It is shown that the MDC must be at least 128 bits long to defend against birthday type of attacks. This creates a challenge to the designer of the MDC, if he wants to employ the DEA which is a 64 bit algorithm. In effect, a secure method must be found to transform the DEA into a 128 bit algorithm. Two methods are identified which provide a sufficient degree of coupling between DEA processes.

The first method employs four encryption steps per DEA block and provides the higher degree of security. Coupling between the different DEA operations is provided by using the input keys also as data in two of the four encryption steps. In addition, there is cross coupling by interchanging half of the internal keys. Although this second coupling operation does not add to security in this scheme, it is mandatory in the second method, which employs only two encryption steps per DEA block to trade off security for performance. By providing key cross coupling in both schemes, an identical kernel is established for both methods. This has an implementation advantage since the first method can be achieved by applying the second method twice.

It should be realized that security against insider attacks can be significantly increased if the origin keys, K1[1] and K2[1], are not known until the time of MDC generation. Since then the insider cannot tailor his innocuous message M to the knowledge of the MDC process, he ends up being no better off than the outsider. Dynamic, instead of static, origin keys should therefore be implemented, whenever permissible, since it is an expensive way to increase security.

DESCRIPTION OF THE APPARATUS EMBODIMENTS OF THE INVENTION

Figure 9:
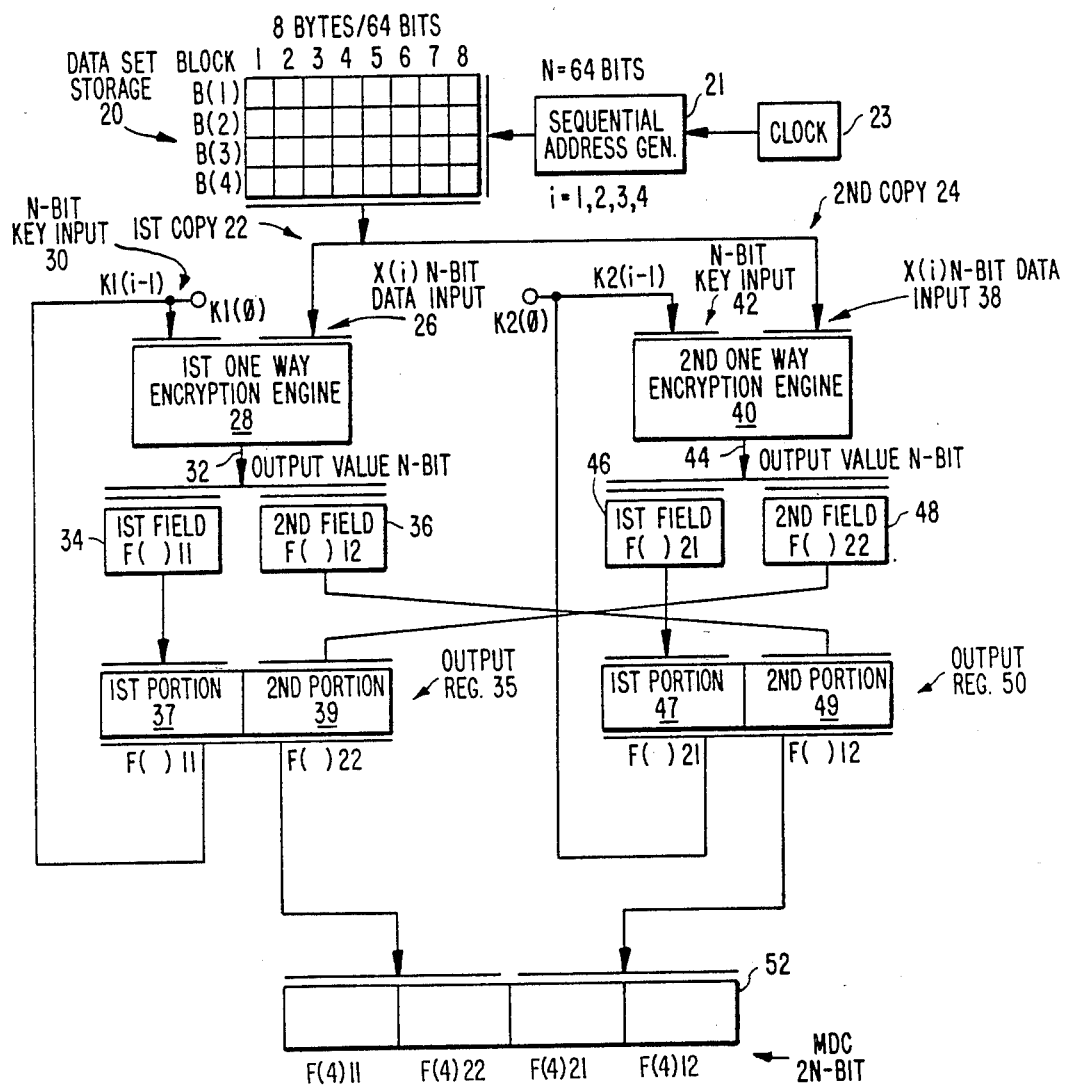
FIG. 9 shows a first embodiment of the MDC generator.

A first embodiment of the modification detection code generator is shown in FIG. 9, for generating a 2N-bit modification detection code (MDC) which characterizes a data set consisting of a plurality of N bit blocks of data. As a specific example, N is equal to 64 bits and four blocks of 64 bits each are considered the data set which is to be characterized by a 128-bit modification detection code. The four blocks labeled B(1), B(2), B(3) and B(4) are in the data set storage 20 shown in FIG. 9. The designation B(i) indicates the ith block of data. The sequential address generator 21 sequentially accesses each consecutive block B(i) for i=1, 2, 3 and 4, in consecutive time intervals T1, T2, T3 and T4 respectively, as defined by the clock 23.

During the first time interval T1, a first one of the data blocks B(1) is accessed from the data set storage 20. A first copy 22 of the N bit block B(1) is applied to the data input 26 of a first one way encryption engine 28. The encryption engine 28 has a key input 30 to which is applied a first initial N bit key Kl(0). During the first time interval T1, the first encryption engine 28 produces an N bit output value 32. The N bit output value 32 has a first field 34 which can be designated F(i)11 and it has a second field 36 which can be designated F(i)12, where i=1 during the first time interval T1. The first field 34 is stored in a first portion 37 of the first output register 35 and the second field 36 is stored in a second portion 49 of a second output register 50 during the first interval T1.

Figure 14:
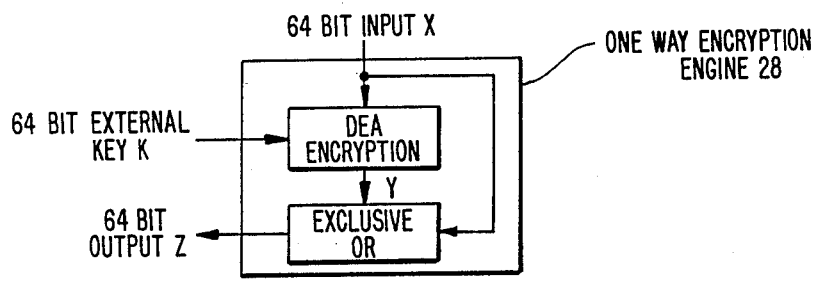
FIG. 14 shows an example of the one way encryption engine.

FIG. 14 illustrates one example of the one way encryption engine 28, based on the Data Encryption Algorithm (DEA), wherein a 64 bit data input X is transformed under control of a 64 bit cryptographic key K to produce a 64 bit output Z of the one way encryption engine. The output Z is developed as follows. The 64 bit input X is first encrypted with the DEA using the 64 bit key K to produce a 64 bit intermediate output Y. The value Y is then exclusive OR'ed with the input X to produce the final output Z. Other encryption algorithms can be substituted for the DEA, to accommodate other key and data sizes. For example, an alternate encryption algorithm can encrypt 64 bit input data using a 128 bit key to produce a 64 bit intermediate output, which will be referred to in a later embodiment of the invention.

A second copy 24 of the data block B(1) is applied to the input 38 of a second one way encryption engine 40, which is identical to engine 28. The encryption engine 40 has a second N bit key 42, designated K2(0), applied thereto. The second encryption engine 40 outputs a second N bit output value 44 during the first time interval T1.

The second N bit output value 44 is comprised of two fields, a first field 46 which can be designated F(i)21 and a second field 48 which can be designated F(i)22, where i=1 during the first time interval T1. The first field 46 of the second N bit output 44 is stored in a first portion 47 of the second output register 50 and the second field 48 of the second N bit output 44 is stored in a second portion 39 of the first output register 35, during the first time interval T1.

In this example, the contents of the first output register 35 is a first result value RL(1) which consists of the 32 bits F(1)11 in the first portion 37 and the 32 bits F(1)22 in the second portion 39. The contents of the second output register 50 is a second result value RR(1) which consists of the 32 bits of F(1)21 in the first portion 47 and the 32 bits of F(1)12 in the second portion 49. RL(1) and RR(1) result for the first time interval T1.

During the second time interval T2 when i=2, the second N bit data block B(2) is accessed from the data set storage 20 and the first copy 22 is applied to the data input 26 of the first one way encryption engine 28. During the second time interval T2, the existing first result value RL(1) which was stored in the first output register 35 during the first time interval T1, is used as the next N bit key Kl(1) which is applied to the key input 30 of the first one way encryption engine 28 during the current second time interval T2.

Similarly, a second copy of the data block B(2) is applied to the data input 38 of the second encryption engine 40 during the second time interval T2. The second result value RR(1) which was stored in the second output register 50 during the first time interval T1, is used during the second time interval T2 as the N bit key K2(1) to the key input 42 of the second encryption engine 40. In this manner, during the second time interval T2, a next first result value RL(2) is stored in the first output register 35 and a next second result value RR(2) is stored in the second output register 50.

The operation of the system shown in FIG. 9 continues during the third time interval T3 and the fourth time interval T4 so that the data blocks B(3) and B(4) are consecutively accessed from the data set storage 20 and processed in a manner similar to the processing of B(1) and B(2), as described above. When the last value RL(4) for the first result is stored during the fourth time interval T4 in the first output register 35 and when the last value RR(4) for the second result value is stored in the second output register 50, corresponding to the last data block B(4) of the plurality of data blocks in the data set storage 20, then the modification detection code can be assembled.

By combining the last first result value RL(4) from the first output register 35 and the last second result value RR(4) from the second output register 50 in the MDC register 52 shown in FIG. 9, a 2N-bit or 128-bit modification detection code is formed. This modification detection code stored in the register 52, characterizes the data set of four data blocks stored in the data set storage 20.

In data storage applications, the MDC can then be stored along with the data set in a storage medium such as a magnetic disk or tape, to enable detection of any tampering with the data set. When it is desired to read the data set from the storage medium, before it is used, the MDC is recomputed in the same manner as described above and the recomputed MDC is compared with the stored MDC. If the comparison is equal, then the data set has not suffered tampering. Similarly, in data communications applications, the MDC can be transmitted along with the data set to the recipient, who can then recompute the MDC from the received data and compare it with the received MDC to determine if tampering with the data set has taken place.

The above example called for the fields 34, 36, 46 and 48 to each of the 32 bits in length, of contiguous bits from their respective 64-bit output values 32 and 44, respectively. However, it it within the scope of the invention to allocate other portions of the output value 32 for the first field 34 and the second field 36 and to allocate other portions of the output value 44 for the first field 46 and the second field 48.

For example, the first field 34 and the second field 36 can consist of an unequal number of bits. The first field 46 and the second field 48 can consist of an unequal number of bits. Alternately, the first field 34 and the second field 36 can consist of bits taken from noncontiguous locations in the first output value 32. The first field 46 can consist of bits taken from noncontiguous locations in the second output value 44.

In the above example, the 2N-bit modification detection code consisted of the concatenation of RL(i) and RR(i). However, it is within the scope of the invention to alter the order of the first and second fields of RL(i) and RR(i) in the modification detection code. For example, the 2N-bit modification detection code can consist of N noncontiguous bits from the first N bit output register 35 mixed with N noncontiguous bits from the second N bit output register 50.

In the above example, the initial value for the first key K1(0) is a first constant and the initial value of the second key K2(0) is a second constant. However, it is within the scope of the invention to make the initial value of the first key K1(0) a first variable quantity and the initial value of the second key K2(0) a second variable quantity. Still further, during the first cycle T1, it is within the scope of the invention to perform a comparison of the value of the first key K1(0) with a value of the second key K2(0) and to modify the value of the second key K2(0) if it is found to be equal to the value of the first key K1(0). This modification in the value of the second key can be performed by operating on the first key and on the second key by selecting a distinguishing field in the first key and in the second key and modifying the bit values in the first distinguishing field and in the second distinguishing field so that they are mutually different.

The initial value of the key K1(0) input to the first one way encryption engine 28 and the initial value K2(0) input to the second one way encryption engine 40, is applied at initial program load time by the host system, for example.

Figure 10:
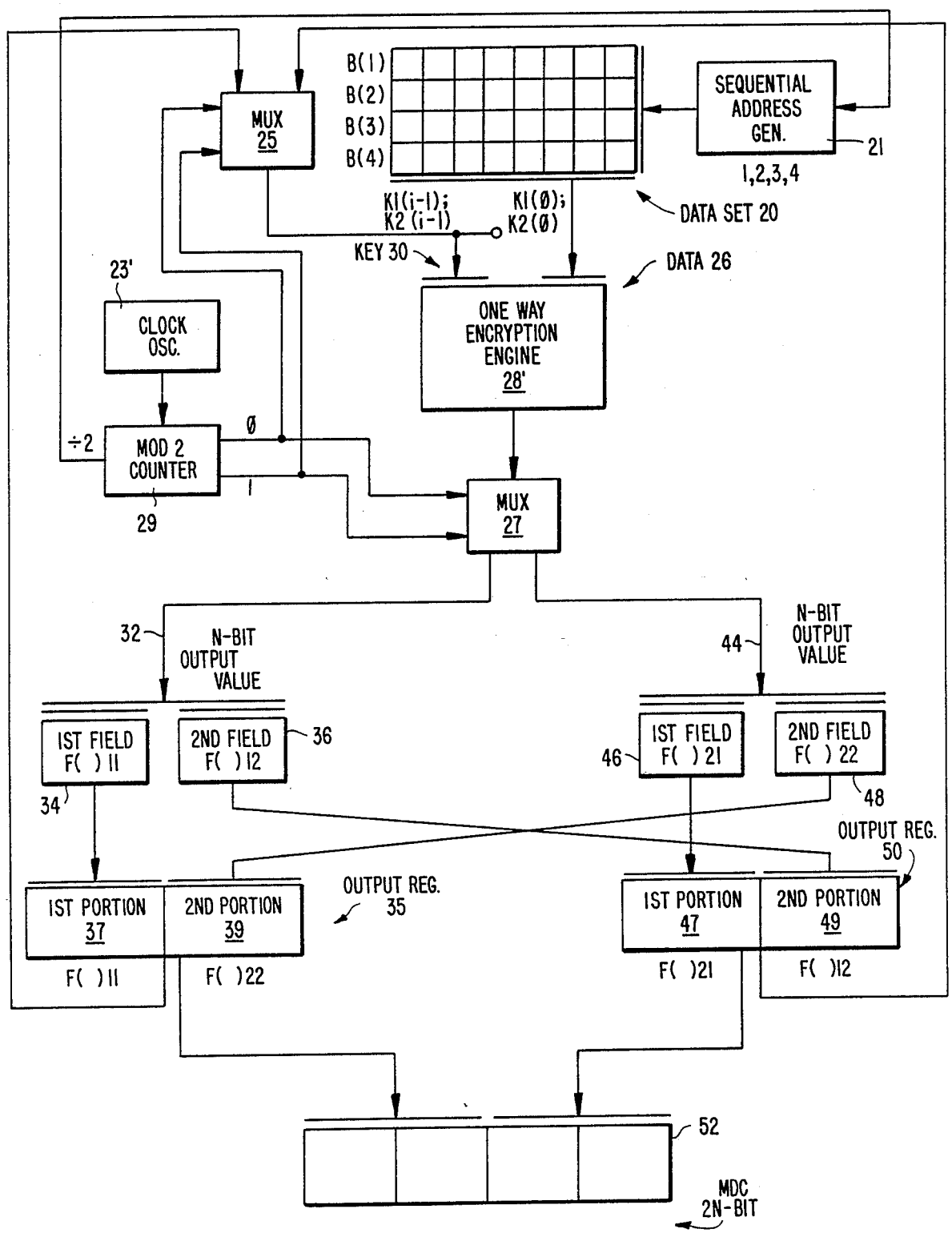
FIG. 10 shows a second embodiment of the MDC generator.

FIG. 10 illustrates a first alternate embodiment of the invention, wherein a single one way encryption engine 28 is employed to carry out the generation of the modification detection code in a manner similar to that described for FIG. 9. FIG. 10 differs from the FIG. 9 in that a clock oscillator 23' generates a clock signal at a rate twice as fast as the clock oscillator 23 in FIG. 9. The clock oscillator 23' in FIG. 10 has its output applied to the mod 2 counter 29 which generates non-overlapping enabling signals at one half the frequency of the clock oscillator 23', those enabling signals being applied to the multiplexer 25 and the multiplexer 27. The output of the clock oscillator 23' is also divided by two with the counter 29, and the half frequency waveform is applied to the sequential address generator 21, in a manner similar to that described for the clock 23 in FIG. 9. Thus, each time the sequential address generator 21 is incremented to address a next data block in the data set 20, the multiplexer 25 and the multiplexer 27 are switched twice.

The multiplexer 25 has the output of the output register 35 connected to a first input thereof and the output of the second output register 50 connected as a second input thereof. Thus, during each access of a data block from the data set 20, two cycles obtain, the first cycle having the output of register 35 used as the key value K1(i−1) which is applied to the key input 30 of the encryption engine 28 and during a second cycle, the output of the second register 50 is applied as the key input K2(i−1) to the key input 30 of the encryption engine 28, both the first cycle and the second cycle occurring during the application of the data block B(i) to the data input 26 of the encryption engine 28. During the first cycle, the output of the encryption engine 28 is steered by the multiplexer 27 as the output value 32 and during the second cycle, the second output from the encryption engine 28 is steered by the multiplexer 27 as the output 44, the outputs 32 and 44 being the same as those described for FIG. 9.

In this manner, in the alternate embodiment of the invention a single one way encryption engine 28 can be employed to generate the modification detection code which results in register 52, in a manner similar to that described for the preferred embodiment of the invention disclosed in FIG. 9.

Figure 11:
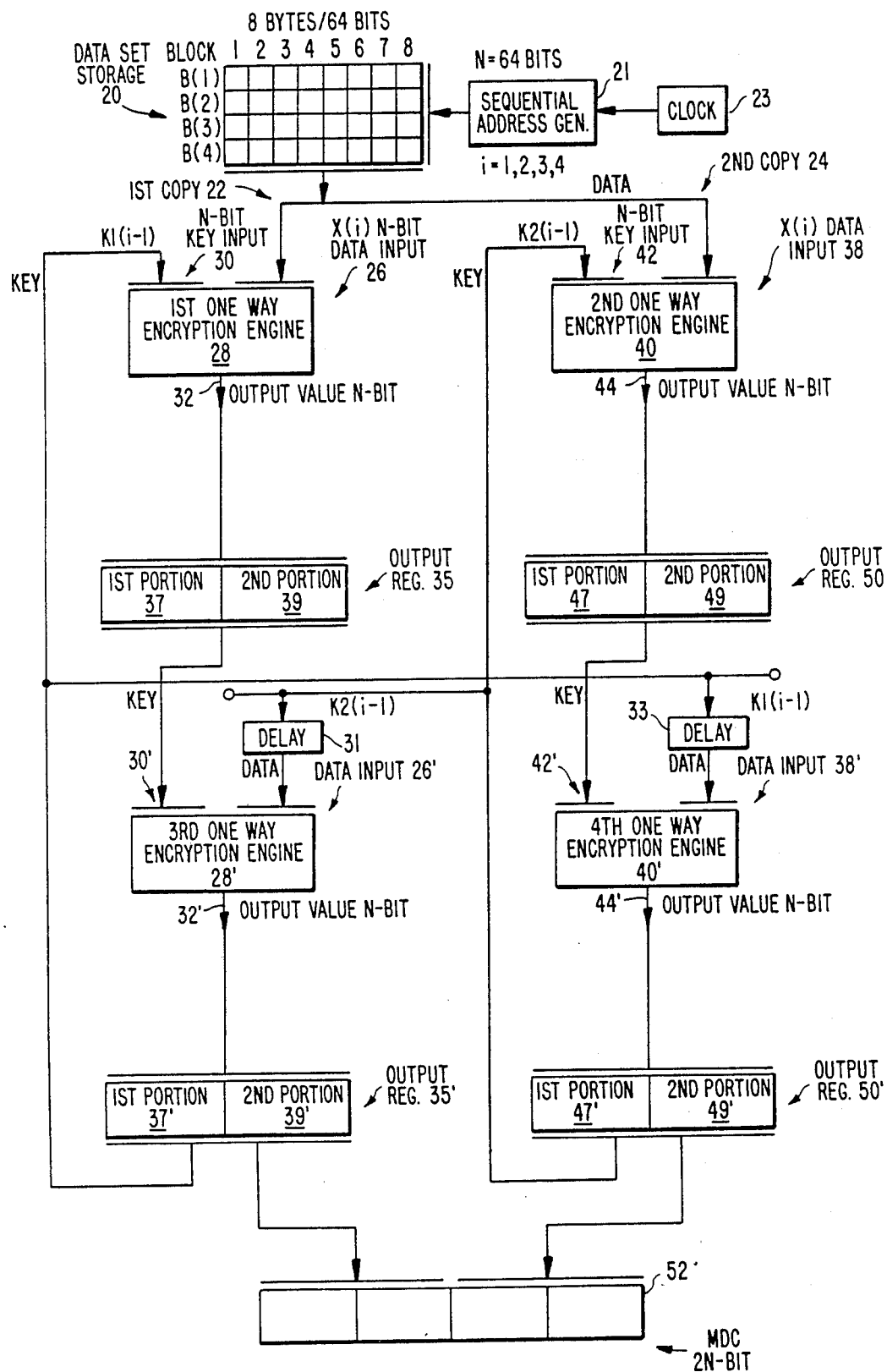
FIG. 11 shows a third embodiment of the MDC generator.

FIG. 11 shows the second alternate embodiment of the invention which employs four encryption engines 28, 28', 40 and 40'. Each of the encryption engines in FIG. 11 is the same as the encryption engine 28 shown in FIG. 9. When a first data block B(i) is accessed from the data set 20 in FIG. 11, it is processed by the first encryption engine 28 and the second encryption engine 40 in a manner similar to that described for FIG. 9. The output 32 from the first encryption engine is then directly applied to the output register 35 and the output from the encryption engine 40 is then directly applied to the output register 50. The contents of register 35 are then applied to the key input 30' of the third encryption engine 28' and the data input 26' has applied to it the key value K2(i−1) generated during the previous processing interval by the output register 50' of FIG. 11. The third encryption engine 28' then outputs an output value 32' which is then stored in the output register 35'. The contents of the output register 35' is then the key value Kl(i) which will be applied during the next processing interval to the key input 30 of the first encryption engine 28 and also to the data input 38' of the fourth one way encryption engine 40' during the next processing interval.

In a similar manner, the output register 50 from the second one way encryption engine 40, is directly applied to the key input 42' of the fourth encryption engine 40' and the data input 38' of the fourth encryption engine 40' has applied thereto, the key value Kl(i−1) generated during the preceding processing interval at the output register 35'. The fourth one way encryption engine 40' processes the values input at the key input 42' and the data input 38' and outputs a value at 44' which is stored in the output register 50' and is made available as the key value K2(i) which is applied during the next processing interval to the key input 42 of the second one way encryption engine 40 and to the data input 26' of the third one way encryption engine 28'. The process continues in this manner until all of the data blocks B(i) in the data set 20 have been so processed, and then the modification detection code is generated in the register 52, in a manner similar to that described previously for FIG. 9.

Figure 12:
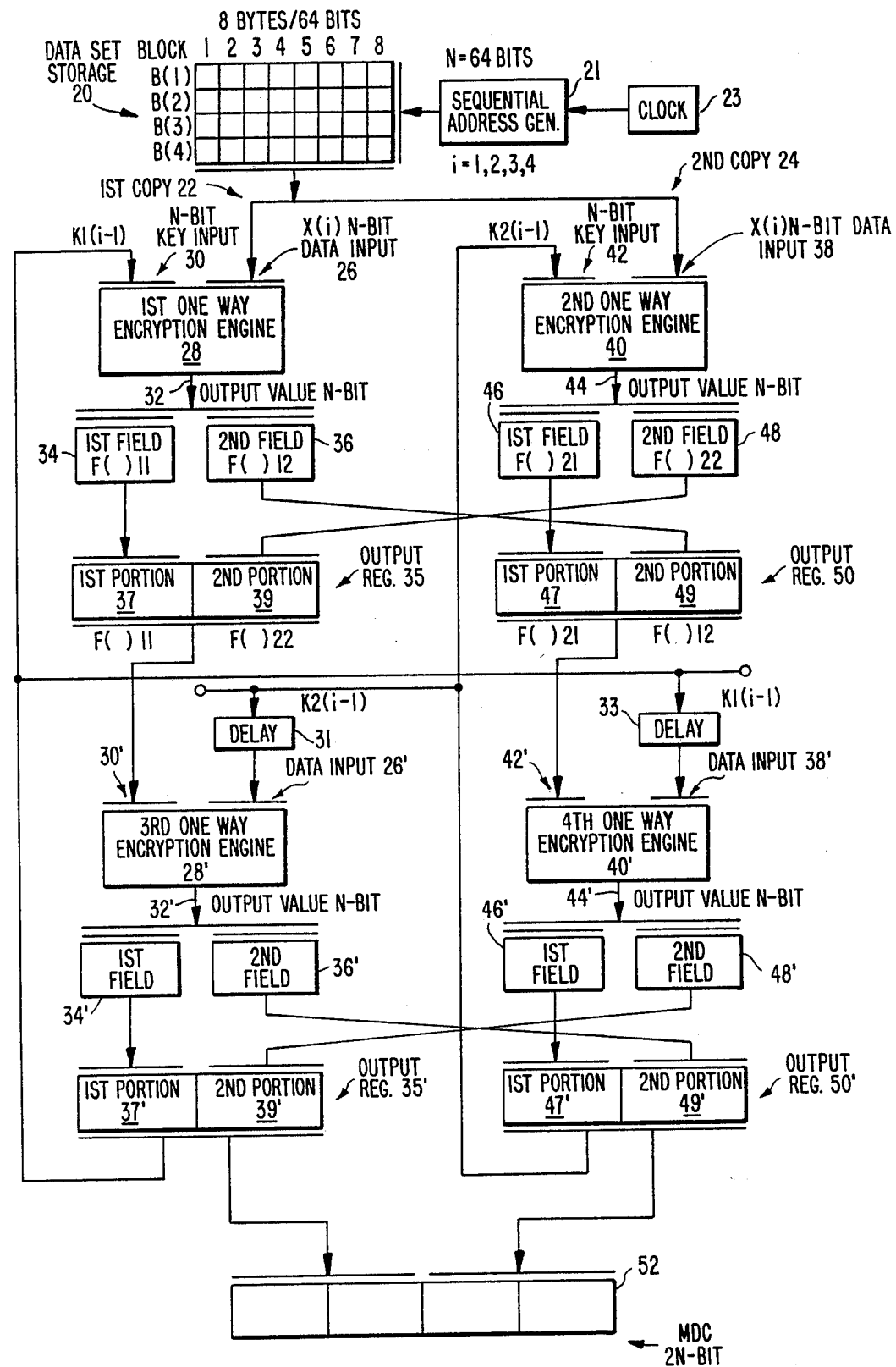
FIG. 12 shows a fourth embodiment of the MDC generator.

FIG. 12 is a third alternate embodiment of the invention which adds to the configuration shown in FIG. 11, the additional feature of performing the field switching operations on the outputs of the encryption engines, in a manner similar to that described previously for FIG. 9. Specifically, in FIG. 12, the output of the first engine 28 has the first field 34 applied to a first portion 37 of the output register 35 and has a second field 36 applied to a second portion 49 of the second output register 50. The output of the second encryption engine 40 has a first field 46 applied to a first portion 47 of the second output register 50 and has a second field 48 applied to a second portion 39 of the first output register 35. Similarly, the output of the third encryption engine 28' has a first field applied to the first portion 37' of the output register 35' and has a second field 36' applied to a second portion 49' of the output register 50'. The fourth encryption engine 40' has a first field 46' applied as a first portion 47' of the output register 50' and has a second field 48' applied as a second portion 39' to the output register 35'. The modification detection code is then constructed in the register 52, in a manner similar to that described for FIG. 11.

Cryptographic Program Load Based on the MDC

One of the basic requirements for a secure operation of a system node is that the integrity of the program loading process must be assured. Otherwise attacks are possible where an opponent is able to circumvent security measures by loading a program which contains sections inserted by an opponent who may retrieve information from the system he is not supposed to get.

The requirement is satisfied by calculating the modification detection code, MDC, which is a strong one way function of the input program. Employing a strong one way function assures that it is not practically possible to find one or more programs resulting in the same MDC. By separately storing the nonsecret MDC value with integrity in the system node, only the program which corresponds to that MDC will be accepted as valid by the system. This method, which uses a symmetric algorithm, differs from an asymmetric algorithm (public key) approach because it employs only public cryptographic variables.

It should now be apparent that loading a single MDC of relatively short length via a direct, secure path to the cryptographic device (e.g., using a key-pad-with-cable attached directly to the cryptographic device) is a feasible task, whereas the manual entry of an entire program via a key pad would be humanly impossible. The MDC and the MDC authentication procedure thus make it possible to load the program electronically via a channel interface (i.e., via an insecure, but expedient path).

If the information to be checked is dynamic, then the authentication code (MAC or DSG) must be generated on the fly. To prevent an opponent from generating a valid authentication code (AC) for a bogus message, the AC generating process must involve a secret key, regardless if a symmetric or an asymmetric algorithm is employed.

If the information is static, it is possible to employ a symmetric algorithm with public quantities in the AC generating as well as in the AC validation process as shown below. The fundamental reason for this is that a cryptographic parameter, defined modification detection code (MDC), can be precomputed. To discuss this concept in more detail, it is applied to program loading procedures with integrity, i.e., to assure that only the valid program is accepted by the system. As a first step, an MDC is computed, once the program has been completed and validated. Subsequently this MDC is distributed to and loaded into (with integrity) the system node which has to validate the program.

Although the initialization requirement for MDC and public key loading is identical, the validation of the program loading process differs sharply between the MDC method, using a symmetric algorithm, and the DSG method, using an asymmetric (public key) algorithm.

With the PKA approach any number of programs can be loaded since a valid DSG can be generated by that node in the system (origin node) which possesses the correct secret key. Managing this secret key and limiting its use is therefore of utmost importance and represents one major security problem which must be addressed. With the MDC method, the MDC is directly connected to only one particular program. Hence only the program associated with the one corresponding to the stored MDC will be accepted as valid. Instead of having to manage a secret key at the origin node, it must be assured here that the correct public MDC parameter is stored at the destination node.

Loading of a bogus program is only possible if the stored reference MDC can be changed by an opponent to his bogus MDC associated with his bogus program. A similar attack is possible with a PKA implementation since an opponent who has the capability to change system references, such as the MDC, can also change a public key. After generating his own PKA key pair, PK/SK, he could install the bogus PK, and generate a bogus DSG with the bogus SK for a bogus program. (These attacks are not viable if the public quantities, i.e., MDC or PKA, are loaded and stored with integrity, as required.)

To implement the MDC concept, stringent cryptographic requirements must be satisfied for the MDC to thwart attacks by insiders, who have access to the system, and outsiders, who have not. It is assumed that the insider can have a valid program MDC installed on his behalf and that the outsider does not have this capability.

Consequently, an insider, such as the person who is instructed to write the program, must not be able to construct two (or more) programs which result in the same MDC. If he is able to do that, he could write two programs, the legitimate and the bogus program, having identical MDCs. The legitimate one and its MDC, after internal administrative program validation procedures are successfully completed, will be accepted. The system will now, however, also accept the bogus program as valid. An outsider, who does not have the opportunity to have his MDC accepted, will only succeed if he can create a bogus program having an MDC equal to the MDC of the legitimate program. In other words, an insider will succeed if he finds any two (or more) programs having the same MDC. An outsider will succeed if he can produce a program with a given, predetermined MDC. Such attacks can be blunted if the MDC is a strong one way function of the input information, where a strong one way function definition is given above.

The advantage of the MDC program load approach is that the manufacturer of the cryptographic facility, who may wish also to provide the software program to be loaded into the cryptographic facility, is able to calculate and release to customers the MDC which is to be used to load that software program. Moreover, a third party could validate the MDC by performing the MDC calculation, after which all other parties could use that particular MDC to load the software program. Thus the customer is not required to calculate the MDC on the program; he only loads the supplied MDC into the device for subsequent program load checking. Since the manufacturer can calculate the MDC using only public information, he has no liability which might arise if he had to know secret information. (This would be the case if the manufacturer had to assist in generating a MAC or a DSG.) Also, since only that one program which produces the stored reference MDC can be loaded, the manufacturer cannot misuse the public cryptographic information he has to cause a bogus program to be loaded into the customer's device. This contrasts sharply with the MAC and PKA approaches. (If the manufacturer knew the secret component needed to calculate the MAC or DSG, he could cause any program of his choosing to be loaded.) The point is that the MDC achieves two goals that are not achieved with the DSG or MAC methods, i.e., (1) the method allows a third party to be involved in the MDC generating process without having to assume any liability, and (2) the method prevents the third party from delivering a bogus program which has the same MDC as the legitimate program.

Figure 13:
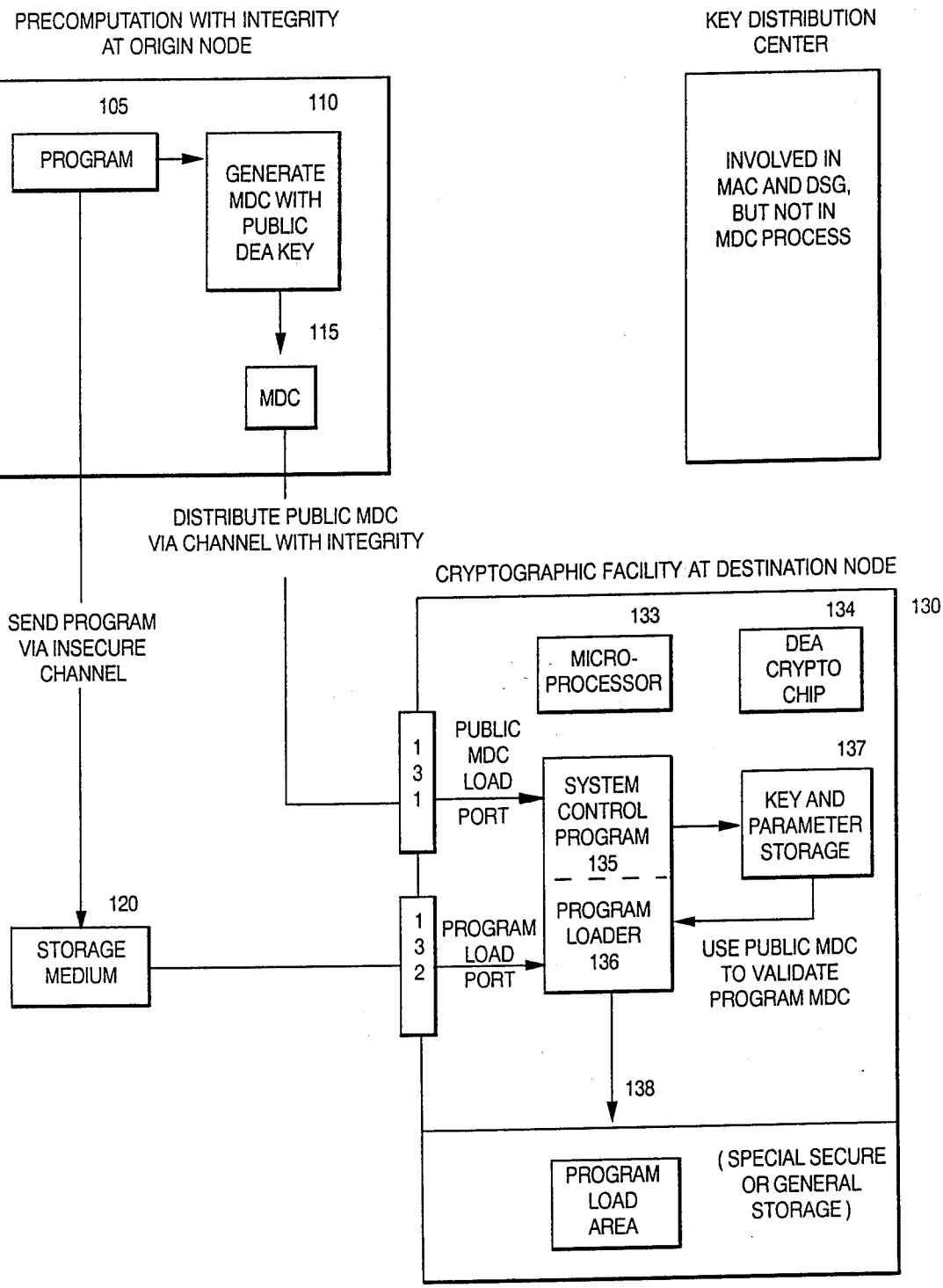
FIG. 13 shows cryptographic program load based on the MDC.

The operation of the invention for cryptographic program load based on the MDC is shown in FIG. 13. A precomputation step is first performed in which a program 105 is input to generate a MDC function at 110 to calculate MDC T1. Program 105 is then distributed over an insecure channel and temporarily stored on storage medium 120. MDC 115 is distributed over a channel with integrity and loaded into cryptographic facility 130 via a protected MDC load port 131, which may be enabled via a physical key-activated switch and/or a software lock based on a system protected password. The MDC entry process is controlled via system control program 135 which stores the MDC in key and parameter storage 137.

During routine system operation, the program previously stored on storage medium 120 can be loaded into the cryptographic facility via program load port 132 under the control of program loader 136, which is invoked by the user program loader 136 and reads the program and recalculates an MDC on the program using the same algorithm which was originally used during the precomputation step at 110. The calculated MDC is then compared for equality with the MDC of reference which is fetched from the key and parameter storage 137 where it had been previously stored. If no such prestored MDC is present or the comparison is unfavorable, the program is not loaded and the load sequence is aborted. If the comparison is favorable, the program is loaded into the program load area 138.

In summary, the method is based only on nonsecret information for authorizing one and only one data set to be authenticable by a cryptographic facility as shown in FIG. 3, which resides in a receiving computer device. It comprises the following steps:

a. entering a precalculated code (MDC) into the cryptographic facility of the computer device via a secure entry port accessible only to an authorized security officer (e.g. who activates the entry sequence via a physical key-activated switch or secret password);

b storing the entered (MDC) code in a key and parameter storage;

c. loading an executable program as a data set into the cryptographic facility of the computer device from an external medium (i.e. hostile and exposed environment) via a channel interface without integrity;

d. calculating a modification detection code (MDC) on the loaded data set using a one way encoding function depending only on nonsecret information;

e. comparing, for equality, the calculated precalculated (MDC) code stored at step b;

f. marking the data set valid if the comparison at step e is favorable, or marking the data set not valid if the comparison at step e is not favorable.

The loaded data set is program code or micro code which is marked executable if it is found to be valid. The precalculated (MDC) code value entered at step a, is calculated at a generating station and it is transmitted to the using station via a channel with integrity whereas the data set is transmitted via a channel without integrity (i.e., is exposed to an opponent who can modify or replace the data).

By defining a set of primitive cryptographic functions, which cannot be changed, a kernel or set of crypto operations can be established. Such a design is achieved by implementing the set in hardware. The hardware implementation makes it possible to protect sensitive parameters (information) by making sure that they only occur within secure hardware, not in user accessible storage. The overall crypto design, on the other hand, is determined by how and in which order the primitive functions are used. The details of these operations can be determined by programming techniques.

As a result, more complex operations can be achieved. Since the integrity of any such program is checked with an MDC, the overall design cannot be changed as long as the integrity of the MDC is assured. Consequently, it is possible to achieve a high degree of flexibility with the combined approach of a primitive fixed set of functions and a flexible programming approach protected with an MDC.

MDC Generation Using Alternate Key Sizes

Figure 15:
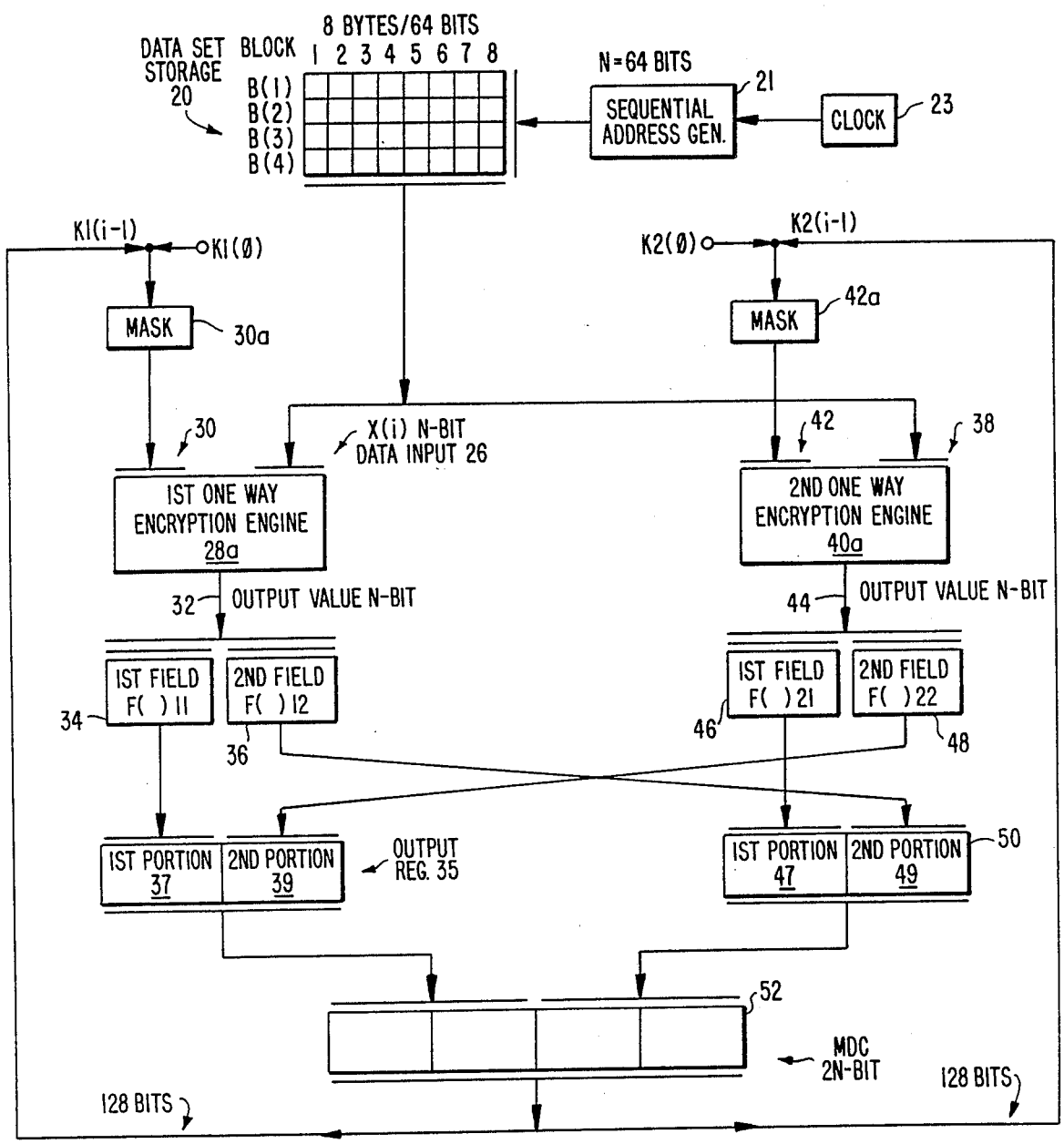
FIG. 15 shows an alternate MDC generator.

FIG. 15 shows a variation of the MDC generator of FIG. 9, wherein alternate key sizes other than that of 64 bits can be used. The one way encryption engine 28a uses an encryption algorithm which inputs 64 bit data blocks at input 26 and inputs keys at input 30 having Z bits, where 64< =Z< =128, and outputs a 64 bit output value at 32. The mask 30a outputs the Z bits of the key to the input 30. The engine 40a can be identical with 28a and mask 42a outputs the Z bits of the key to input 42 of engine 40a. Masks 30a and 42a have mutually different bit mask patterns. As can be seen in FIG. 15, during each cycle, the contents of both portions 37 and 39 of the 64 bit output register 35 are placed in register 52 along with the contents of both portions 47 and 49 of the 64 bit output register 50. The 128 bits in register 52 are then fed back through mask 30a and through mask 42a during each cycle, producing the next Z bit key value for the engines 28a and 40a, respectively. When the last data block has been processed from storage 20, the register 52 contains the 128 bit MDC value which characterizes the data set stored in storage 20. Alternately, masks 30a and 42a can have different bit sizes of Z if the engines 28a and 40a are not identical.

As an example, mask 30a is an exclusive OR of a first 128 bit constant value and the 128 bit contents of register 52. Mask 42a is similar to 30a, but has a different value for the 128 bit constant. The 128 bit result from the exclusive OR in mask 30a is then applied as the key input to engine 28a and the 128 bit output from mask 42a is applied as the key input to engine 40a. This guarantees that the key value input at 30 is always different from the key value input at 42 and further, that these key values are always a function of the outputs (during the previous cycle) at 32 and 44, respectively. Note that the initial value K1(0) must be equal to the initial value K2(0) in order to guarantee that the first key output of the mask 30a is always different from the first key output of the mask 42a. In other applications, fewer than 128 bits can be selected as the key value from the exclusive OR.

An alternate embodiment of FIG. 15 can have the 64 bit output 32 directly applied to the register 52 and the 64 bit output 44 directly applied to the register 52, omitting the field swapping operation by bypassing registers 34, 35, 36, 46, 48 and 50.

Figure 16:
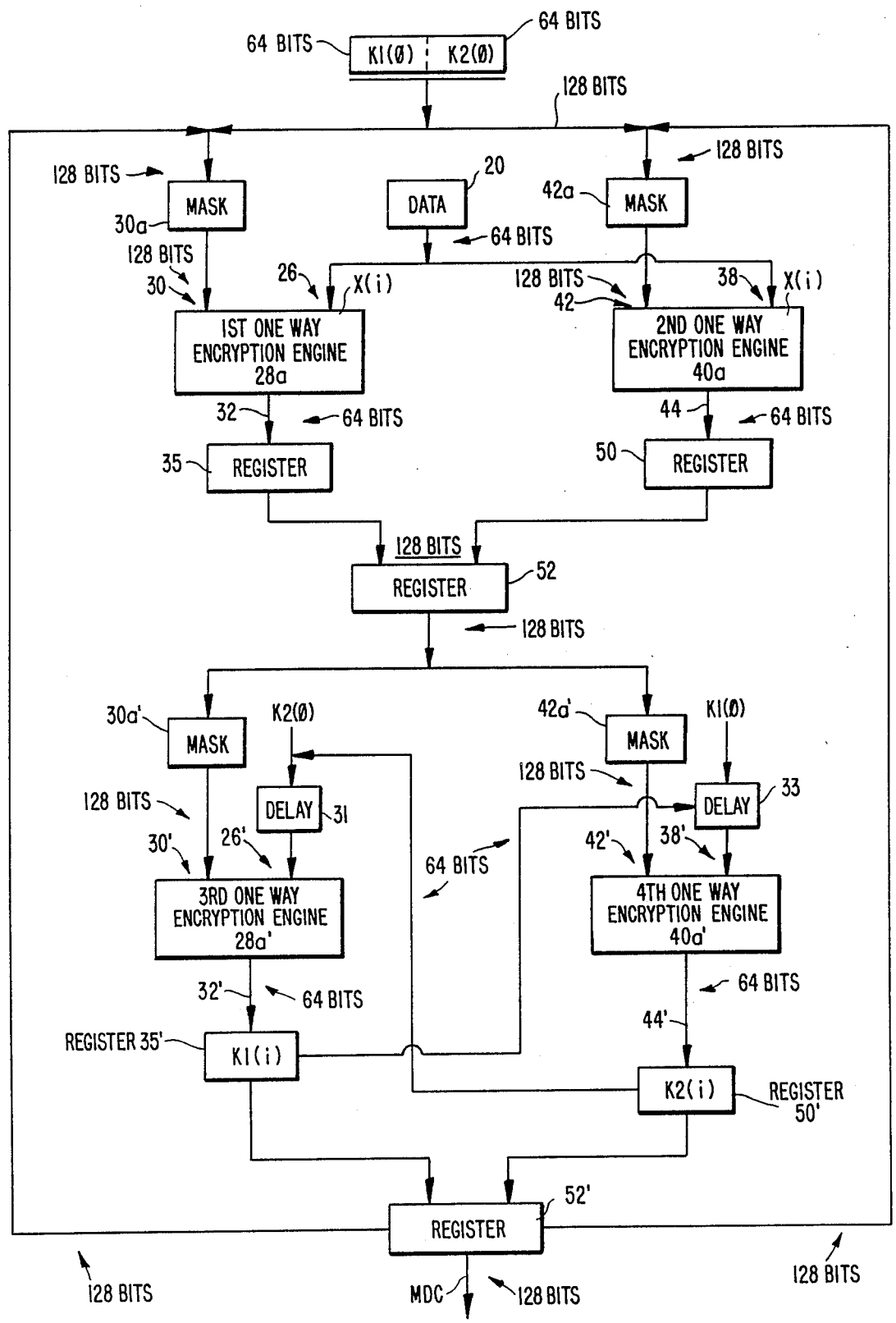
FIG. 16 shows another alternate MDC generator.

FIG. 16 is an alternate embodiment of the invention where the four encryption engines 28a, 40a, 28'a and 40'a operate on a N=64 bit data input with a 2N=128 bit key input to yield a 64 bit output. Mask 30'a can be the same as mask 30a and mask 42'a can be the same as mask 42a. Engine 28'a can be the same as engine 28a and engine 40'a can be the same as engine 40a. The 128 bit contents of register 52 produced by engines 28a and 40a is used as the input value to mask 30'a and 42'a to produce 128 bit key values which are applied to engines 28'a and 40'a. Masks 30'a and 42'a are not the same. The 64 bit output 32'of engine 28'a is K1(i) which is fed through delay 33 to the data input of engine 40'a. The 64 bit output 44' of engine 40'a is K2(i) which is fed through delay 31 to the data input of engine 28'a. The 128 bit contents of registers 52' produced by engines 28'a and 40'a is used as the input value to mask 30a and 42a to produce 128 bit key values which are applied to engines 28a and 40a. When the last data block from storage 20 has been processed, the contents of register 52' is the MDC which characterizes the data set.

Although specific embodiments of the invention have been disclosed, it will be understood by those having skill in the art that minor changes can be made to the specific embodiments disclosed, without departing from the spirit and the scope of the invention.

What is claimed is:

1. A method for generating a 2N-bit modification detection code which characterizes a data set consisting of a plurality of N bit blocks of data, comprising the steps of:
    copying a first one of said data blocks into a first N bit copy and a second N bit copy during a first cycle;
    applying said first N bit copy as the data input to a first one way encryption engine, said encryption engine having a key input with a first initial N bit key and said first encryption engine producing an N bit output value during said first cycle;
    storing a first field of said first output value in a first output register and storing a second field of said first output value in a second output register during said first cycle;
    applying said second N bit copy to the data input of a second one way encryption engine, having a second N bit key applied thereto and outputting a second N bit output value during said first cycle;
    storing a first field of said second N bit output in a first field of said second output register and applying a second field of said second N bit output into a second field of said first output register during said first cycle;
    copying a second one of said plurality of N bit blocks from said data set and applying the first copy thereof to said data input of said first one way encryption engine during a next cycle and applying said value stored in said first output register as the N bit key to said first key input of said first one way encryption engine, and applying said second copy thereof to said data input of said second encryption engine during said next cycle and applying said value stored in said second output register as the N bit key to said second key input of said second encryption engine, to thereby produce a next first result value in said first output register and a next second result value in said second output register;
    continuing the operation for all of said plurality of data blocks in said data set until a last first result value is stored in said first output register and a last second result value is stored i said second output register corresponding to the last one of said plurality of data blocks in said data sets;
    combining said last first result value from said first output register and said last second result value from said second output register as a 2N-bit modification detection code which characterizes said data set.

2. The method of claim 1 wherein said first field and said second field of said first N bit output consist of an unequal number of bits.

3. The method of claim 1 wherein said first field of said first N bit output consists of bits taken from non-contiguous locations in said first N bit output value.

4. The method of claim 1 wherein said first field of said first N bit output is the left half of said N bit output and said second field of said N bit output is the right half thereof.

5. The method of claim 1 wherein said 2N-bit modification detection code consists of the concatenation of said last first result value and said last second result value.

6. The method of claim 1 wherein said 2N-bit modification detection code consists of N noncontiguous bits from said last first result value mixed with N noncontiguous bits from said last second result value, forming a 2N-bit expression.

7. The method of claim 1 wherein said initial values for said first key is a first constant and where said initial value of said second key is a second constant.

8. The method of claim 1 wherein said initial value of said first key is a first variable quantity and said initial value of said second key is a second variable quantity.

9. The method of claim 1 which further comprises the steps of:
during said first cycle, comparing the value of said first key with the value of said second key and modifying the value of said second key if said first key and said second key are equal.

10. The method of claim 1 which further comprises the steps of:
operating on said first key and said second key so that they are not equal.

11. The method of claim 1 which further comprises the steps of:
operating on said first key and said second key so that selecting a distinguishing field in said first key and in said second key and modifying the bit values in said first distinguishing field and said second distinguishing field so that they are mutually different.

12. An apparatus for generating a 2N-bit modification detection code which characterizes a data set consisting of a plurality of N bit blocks of data, comprising the steps of:
means for copying a first one of said data blocks into a first N bit copy and a second N bit copy during a first cycle;
means for applying said first N bit copy as the data input to a first one way encryption engine, said encryption engine having a key input with a first initial N bit key and said first encryption engine producing an N bit output value during said first cycle;
means for storing a first field of said first output value in a first output register and storing a second field of said first output value in a second output register during said first cycle;
means for applying said second N bit copy to the data input of a second one way encryption engine, having a second N bit key applied thereto and outputting a second N bit output value during said first cycle;
means for storing a first field of said second N bit output in a first field of said second output register and applying a second field of said second N bit output into a second field of said first output register during said first cycle;
means for copying a second one of said plurality of N bit blocks from said data set and applying the first copy thereof to said data input of said first one way encryption engine during a next cycle and applying said value stored in said first output register as the N bit key to said first key input of said first one way encryption engine, and applying said second copy thereof to said data input of said second encryption engine during said next cycle and applying said value stored in said second output register as the N bit key to said second key input of said second encryption engine, to thereby produce a next first result value in said first output register and a next second result value in said second output register.

13. In a network including first and second interconnected computer devices with cryptographic capability that are loaded with programs, comprising:
a first insecure communication channel and a second secure communication channel interconnecting said first and second computer devices;
a first encoding means in said first computer device, with integrity and depending only on public values coupled to said first and second channels and adapted for transforming information (I) to a first one way encoding function modification detection code (MDC) and for transmitting I on said first insecure communication channel and said first MDC on said second secure channel;
a second encoding means in said second computer device, with integrally and depending only on public values coupled to said first and second channels and adapted for receiving I from said first insecure channel and said first MDC from said second secure channel and for transforming the received information I to a second one way encoding function MDC via the same one way encoding function at said first encoding means;
a comparator means in said second computer device for comparing said second MDC calculated from the I received from said first insecure channel with said first MDC received from said second secure channel, and accepting the information I received from said first insecure channel if said first MDC compares with said second MDC;
means to transfer said accepted information I to a memory.

14. A method for generating a 2N-bit modification detection code which characterizes a data set consisting of a plurality of N bit blocks of data, comprising the steps of:
applying a first one of said data blocks as the data input to a one way encryption engine, said encryption engine having a key input with a first N bit key and said encryption engine producing an N bit first output value;
storing a first field of said first output value in a first portion of a first output register and storing a second field of said first output value in a second portion of a second output register;
applying a second N bit key to said key input of said one way encryption engine, which operates on said first data block to output a second N bit output value;
storing a first field of said second N bit output in a first portion of said second output register and storing a second field of said second N bit output into a second portion of said first output register;
applying a second one of said plurality of N bit blocks to said data input of said one way encryption engine and applying said value stored in said first output register as the N bit key to said key input of said one way encryption engine to produce a next first output value and applying said value stored in said second output register as the N bit key to said second key input of said encryption engine which operates on said second data base to produce a next second output value;
storing a first field of said next first output value in a first portion of a first output register and storing a second field of said next first output value in a second portion of a second output register;

storing a first field of said next second N bit output in a first portion of said second output register and storing a second field of said next second N bit output into a second portion of said first output register;

continuing the operation for all of said plurality of data blocks in said data set until a last first result value is stored in said first output register and a last second result value is stored in said second output register corresponding to the last one of said plurality of data blocks in said data sets;

combining said last first result value from said first output register and said last second result value from said second output register as a 2N-bit modification detection code which characterizes said data set.

15. A method for generating a 2N-bit modification detection code which characterizes a data set consisting of a plurality of N bit blocks of data, comprising the steps of:

performing a one way encryption of a first one of said data blocks using a first key value and outputting a first N bit result;

performing a one way encryption of said first data block using a second key value and outputting a second N bit result;

performing a one way encryption of said second key value using said first result as a key value and outputting a third N bit result;

performing a one way encryption of said first key value using said second result as a key value and outputting a fourth N bit result;

feeding back said third N bit result as a next first key value and feeding back said fourth N bit result as a next second key value;

repeating the above steps until the last one of said plurality of data blocks has been so processed to produce a last third N bit result and a last fourth N bit result;

combining said last third result and said last fourth result as a 2N-bit modification detection code which characterizes said data set.

16. A method for generating a 2N-bit modification detection code which characterizes a data set consisting of a plurality of N bit blocks of data, comprising the steps of:

performing a one way encryption of a first one of said data blocks using a first key value and outputting a first N bit result;

performing a one way encryption of said first data block using a second key value and outputting a second N bit result;

forming a next first key value from a first field of said first N bit result and a second field from said second N bit result;

forming a next second key value from a first field of said second N bit result and from a second field of said first N bit result;

performing a one way encryption of a second one of said data blocks using said next first key value and outputting a next first N bit result;

performing a one way encryption of said second data block using said next second key value and outputting a next second N bit result;

repeating the above steps until the last one of said plurality of N bit data blocks has been thereby processed producing a last first N bit result and a last second N bit result; forming a 2N-bit modification detection code from said last first N bit result and said last second N bit result;

whereby said plurality of N bit blocks of data can be characterized.

17. A method for generating a 2N-bit modification detection code which characterizes a data set consisting of a plurality of N bit blocks of data, comprising the steps of:

performing a one way encryption of a first one of said data blocks using a first key value and outputting a first N bit result;

performing a one way encryption of said first data block using a second key value and outputting a second N bit result;

forming a 2N-bit output value from said first N bit result and said second N bit result;

masking said output value to form a next first key value and performing a one way encryption of a next one of said data blocks using said next first key value and outputting a next first N bit result;

masking said output value to form a next second key value and performing a one way encryption of said next one of said data blocks using said next second key value and outputting a next second N bit result;

repeating the above steps until the last one of said plurality of N bit blocks of data has been processed thereby, producing a last first N bit result and a last second N bit result;

forming a 2N-bit modification detection code from said last first N bit result and said last second N bit result;

whereby said plurality of N bit blocks of data are characterized.

18. A method for generating a 2N-bit modification detection code which characterizes a data set consisting of a plurality of N bit blocks of data, comprising the steps of:

forming an initial 2N-bit first key value by masking the combination of a first initial N bit value with a second initial N bit value;

forming an initial 2N-bit second key value by masking the combination of said first initial N bit value with said second initial N bit value;

performing a one way encryption of a first one of said data blocks using said first key value and outputting a first N bit result;

performing a one way encryption of said first data block using said second key value and outputting a second N bit result;

forming a 2N-bit intermediate value from said first N bit result and said second N bit result;

masking said intermediate value to form a third key value and performing a one way encryption of said second initial N bit value using said third key value and outputting a third N bit result which is stored in a first register;

masking said intermediate value to form a fourth key value and performing a one way encryption of said first initial N bit value using said fourth key value and outputting a fourth N bit result which is stored in a second register;

forming a 2N-bit output value from the contents of said first register and said second register;

masking said output value to form a next first key value and performing a one way encryption of a next one of said data blocks using said next first key value and outputting a next first N bit result;

masking said output value to form a next second key value and performing a one way encryption of said next one of said data blocks using said next second key value and outputting a next second N bit result;

forming a next 2N-bit intermediate value from said next first N bit result and said next second N bit result;

masking said next intermediate value to form a next third key value and performing a one way encryption of the contents of said second register using said next third key value and outputting a next third N bit result;

masking said next intermediate value to form a next fourth key value and performing a one way encryption of the contents of said first register using said next fourth key value and outputting a next fourth N bit result;

storing said next third N bit result in said first register and storing said next fourth N bit result in said second register;

forming a next 2N-bit output value from the contents of said first register and the contents of said second register;

repeating the above steps until the last one of said plurality of N bit blocks of data has been processed thereby, producing a last 2N-bit output value;

outputting said last 2N-bit output value as a 2N-bit modification detection code;

whereby said plurality of N bit blocks of data are characterized.

19. A method for enabling a data set to be authenticated by a receiving computer device, comprising the steps of:
 a. entering a precalculated code into the computer device via a secure entry port accessible only to an authorized security officer;
 b. storing the entered code;
 c. loading a data set into the computer device from an external medium via an insecure channel interface;
 d. calculating a modification detection code (MDC) on the loaded data set using a one way encoded function depending only on nonsecret information;
 e. comparing, for equality, the calculated MDC and the precalculated code stored at step b;
 f. marking the data set valid if the comparison at step e shows equality, or marking the data set not valid if the comparison at step e shows no equality.

20. The method of claim 19 wherein the loaded data set is program code which is marked executable if it is found to be valid.

21. The method of claim 19, wherein the code value entered at step a, is calculated at a generating station and the MDC is transmitted to the using station via a secure channel whereas the data set is transmitted via an insecure channel.

* * * * *